(12) United States Patent
Kobayashi et al.

(10) Patent No.: US 12,141,485 B2
(45) Date of Patent: Nov. 12, 2024

(54) INFORMATION PROCESSING APPARATUS FOR ANALYZING CONDITION OF DEVICE

(71) Applicant: CANON KABUSHIKI KAISHA, Tokyo (JP)

(72) Inventors: Masaki Kobayashi, Shizuoka (JP); Daisuke Momiyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/053,443

(22) Filed: Nov. 8, 2022

(65) Prior Publication Data

US 2023/0153041 A1    May 18, 2023

(30) Foreign Application Priority Data

Nov. 12, 2021  (JP) ................. 2021-185149
Jan. 27, 2022  (JP) ................. 2022-011139

(51) Int. Cl.
   *G06F 3/12*    (2006.01)

(52) U.S. Cl.
   CPC ............ *G06F 3/121* (2013.01); *G06F 3/1273* (2013.01); *G06F 3/1284* (2013.01)

(58) Field of Classification Search
   CPC ...... G06F 3/121; G06F 3/1273; G06F 3/1284; G06F 3/1229; G06F 3/1285; G06F 11/34; H04N 1/00015; H04N 1/00034; H04N 1/00055; H04N 1/00344; H04N 1/00832; H04N 1/32683
   See application file for complete search history.

(56) References Cited

U.S. PATENT DOCUMENTS

| | | | | |
|---|---|---|---|---|
| 2009/0106605 A1* | 4/2009 | Kuchibhotla | ....... | G06F 11/0748 |
| | | | | 714/E11.002 |
| 2020/0310724 A1* | 10/2020 | Aher | ..................... | G06F 3/1289 |
| 2021/0368068 A1* | 11/2021 | Schalk | ................... | G06F 3/1208 |
| 2023/0009567 A1* | 1/2023 | Ishihara | ................... | B65H 7/02 |

FOREIGN PATENT DOCUMENTS

| | | |
|---|---|---|
| JP | 3831143 B2 | 10/2006 |
| JP | 2007133307 A | 5/2007 |
| JP | 2012198796 A | 10/2012 |
| JP | 2014002624 A | 1/2014 |
| JP | 2021071657 A | 5/2021 |
| WO | 2016038803 A1 | 3/2016 |

* cited by examiner

*Primary Examiner* — John R Wallace
(74) *Attorney, Agent, or Firm* — ROSSI, KIMMS & McDOWELL LLP

(57) ABSTRACT

An information processing apparatus includes: one or more processors; and one or more memories storing one or more computer programs. The one or more computer programs, when executed by the one or more processors, cause the information processing apparatus to function as: a reception unit configured to receive history information, from a device, indicating an operation history of a predetermined operation in the device; an analysis unit configured to analyze a condition of the device based on the history information in a case where an execution condition is satisfied; and a setting unit configured to set the execution condition, and wherein the setting unit sets the execution condition based on an analysis result by the analysis unit.

8 Claims, 25 Drawing Sheets

| ANALYSIS RESULT | EXECUTION CONDITION |
|---|---|
| 1 | EVERY MONTH |
| 2 | EVERY MONTH |
| 3 | EVERY WEEK |
| 4 | EVERY DAY |

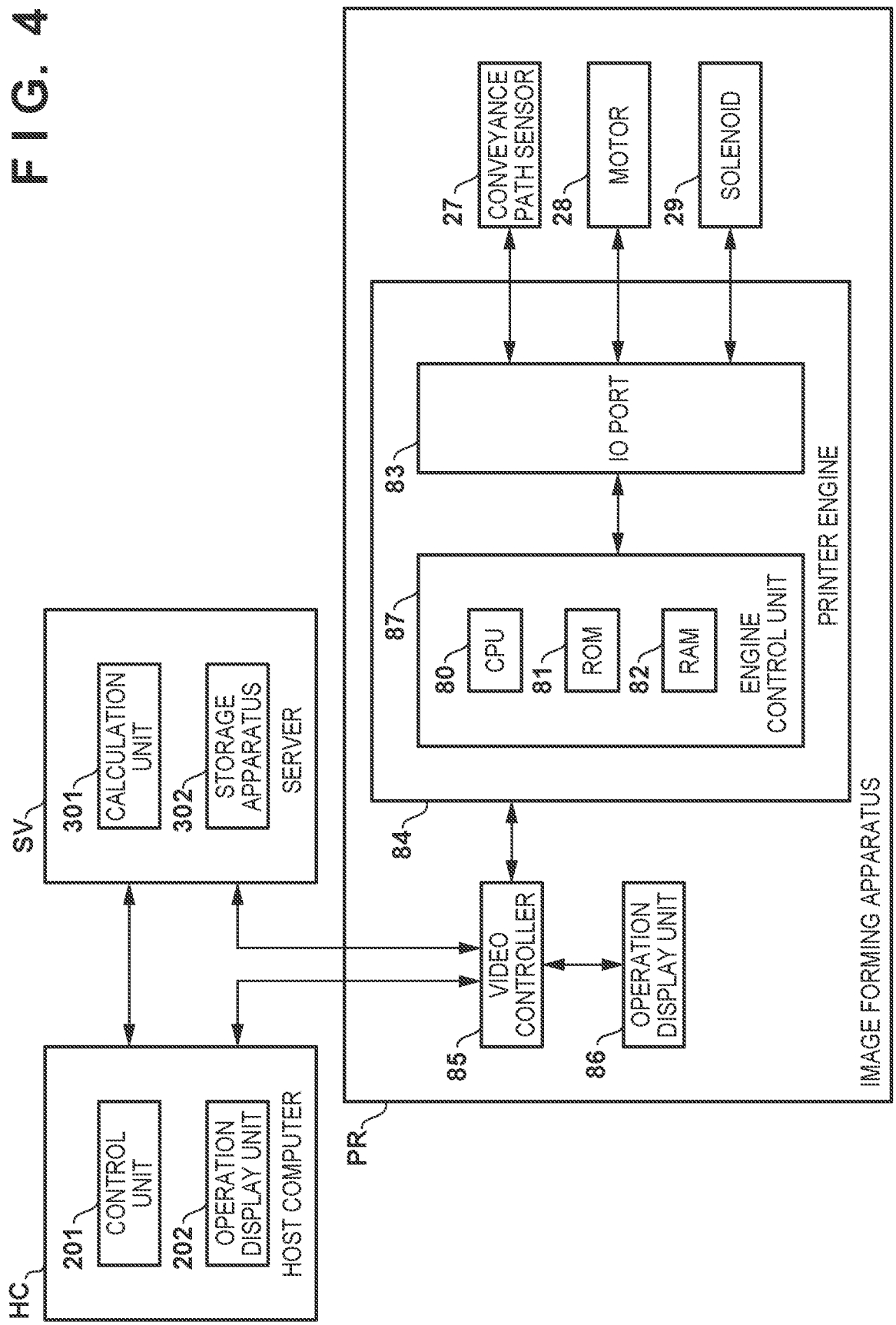

FIG. 6A

| MEASUREMENT TIMING | FEEDING TIME (ms) |
|---|---|
| 2020/01/01 10:00:01 | 1438 |
| 2020/01/01 10:00:04 | 1437 |
| 2020/01/01 10:00:07 | 1405 |
| 2020/01/01 10:00:10 | 1414 |
| ... | ... |
| 2020/03/04 21:05:30 | 1856 |
| 2020/03/04 21:16:50 | 1405 |
| 2020/03/04 21:16:53 | 1398 |

FIG. 6B

| VARIANCE VALUE V | ANALYSIS RESULT |
|---|---|
| V<240 | 1 |
| 240≤V<280 | 2 |
| 280≤V<320 | 3 |
| 320≤V | 4 |

FIG. 6C

| ANALYSIS RESULT | EXECUTION CONDITION |
|---|---|
| 1 | EVERY MONTH |
| 2 | EVERY MONTH |
| 3 | EVERY WEEK |
| 4 | EVERY DAY |

FIG. 9A

| MEASUREMENT TIMING | FEEDING TIME (ms) | ABNORMALITY DETECTION RESULT |
|---|---|---|
| 2020/01/01 10:00:01 | 1438 | NO |
| 2020/01/01 10:00:04 | 1437 | NO |
| 2020/01/01 10:00:07 | 1405 | NO |
| 2020/01/01 10:00:10 | 1414 | NO |
| ... | ... | ... |
| 2020/03/04 21:05:30 | 1856 | YES |
| 2020/03/04 21:16:50 | 1405 | NO |
| 2020/03/04 21:16:53 | 1398 | NO |

FIG. 9B

| NUMBER OF TIMES AN ABNORMALITY IS DETECTED | EXECUTION CONDITION |
|---|---|
| 0 | EVERY MONTH |
| GREATER THAN OR EQUAL TO 1 AND LESS THAN 3 | EVERY DAY |
| GREATER THAN OR EQUAL TO 3 | EVERY 3 HOURS |

FIG. 11A

| FEEDBACK CONTENTS | EXECUTION CONDITION |
|---|---|
| PROBLEM SOLVED BY PERFORMING ACTION AS INSTRUCTED | EVERY WEEK |
| PROBLEM NOT SOLVED BY PERFORMING ACTION AS INSTRUCTED | EVERY DAY |
| PERFORMED ACTION OTHER THAN INSTRUCTED | EVERY DAY |
| ACTION NOT YET PERFORMED | EVERY DAY |

FIG. 11B

| EXECUTION FREQUENCY | EXECUTION CONDITION |
|---|---|
| LOW | EVERY MONTH |
| MEDIUM | EVERY DAY |
| HIGH | EVERY 3 HOURS |

F I G. 13
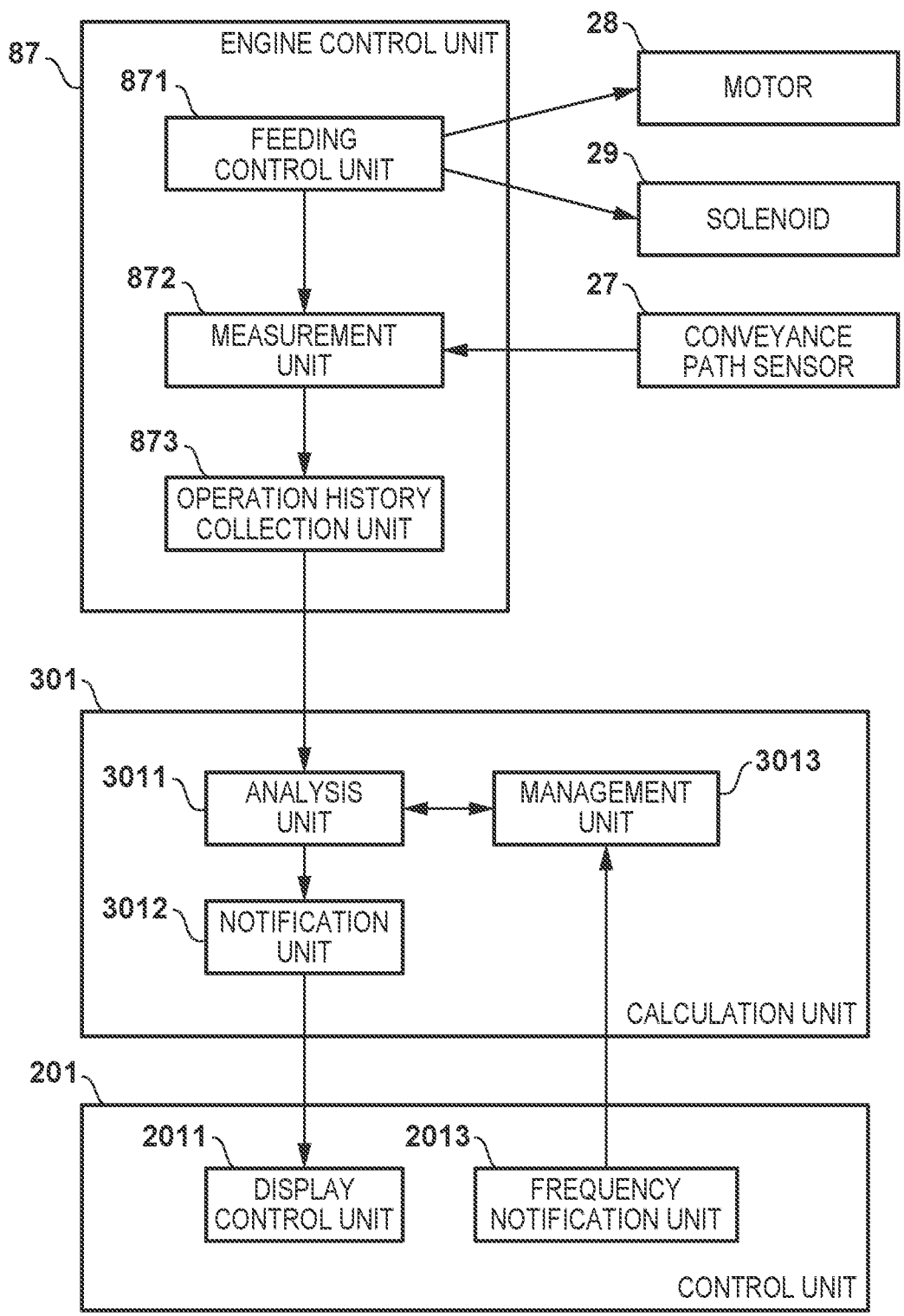

FIG. 15A

| MEASUREMENT TIMING | FEEDING TIME (ms) |
|---|---|
| 2020/01/01 10:00:01 | 1438 |
| 2020/01/01 10:00:04 | 1437 |
| 2020/01/01 10:00:07 | 1405 |
| 2020/01/01 10:00:10 | 1414 |
| ... | ... |
| 2020/03/04 21:05:30 | 1856 |
| 2020/03/04 21:16:50 | 1405 |
| 2020/03/04 21:16:53 | 1398 |

FIG. 15B

| EVALUATION VALUE E | MAINTENANCE MESSAGE |
|---|---|
| E>20 | — |
| 20≥E>0 | PLEASE PREPARE TO REPLACE THE FEED ROLLER |
| 0≥E | PLEASE REPLACE THE FEED ROLLER |

FIG. 16

IS THE NOTIFICATION TIMING FOR REPLACEMENT
PREPARATION OF THE FEED ROLLER MOST APPROPRIATE?

- ● LATE
- ○ GOOD AS IT IS
- ○ EARLY

ANSWER

F I G. 17A

| FEEDBACK | THRESHOLD CHANGE AMOUNT |
|---|---|
| LATE | +3 |
| GOOD AS IT IS | 0 |
| EARLY | -3 |

F I G. 17B

| EVALUATION VALUE | MAINTENANCE MESSAGE |
|---|---|
| E>17 | — |
| 17≥E>0 | PLEASE PREPARE TO REPLACE THE FEED ROLLER |
| 0≥E | PLEASE REPLACE THE FEED ROLLER |

FIG. 20A

| ADMINISTRATOR ID | APPARATUS ID |
|---|---|
| #ABC | #567 |
| | #568 |
| | #569 |
| #GHI | #570 |
| | #571 |
| ... | ... |

FIG. 20B

| APPARATUS ID | ANALYSIS TIMING | EVALUATION VALUE E |
|---|---|---|
| #567 | 2020/01/01 16:00:00 | 20 |
| | 2020/01/08 16:00:00 | 13 |
| | 2020/01/09 16:00:00 | 100 |
| | ... | ... |
| | 2020/11/08 15:00:00 | 15 |
| | 2020/11/09 16:00:00 | 102 |
| | ... | ... |

FIG. 21A

WOULD YOU LIKE TO MAKE THE NOTIFICATION TIMING FOR PREPARATION OF REPLACEMENT OF THE FEED ROLLER EARLIER?

● YES

○ NO

[ANSWER]

FIG. 21B

WOULD YOU LIKE TO MAKE THE NOTIFICATION TIMING FOR PREPARATION OF REPLACEMENT OF THE FEED ROLLER LATER?

● YES

○ NO

[ANSWER]

FIG. 22

| ADMINISTRATOR ID | APPARATUS ID | SECTION C#1 ($20 \geq E > 13$) | SECTION C#2 ($13 \geq E > 7$) | SECTION C#3 ($7 \geq E$) |
|---|---|---|---|---|
| #ABC | #567 | 2 | 0 | 0 |
| | #568 | 1 | 1 | 0 |
| | #569 | 1 | 0 | 0 |
| | TOTAL | 4 | 1 | 0 |
| | RATIO | 80% | 20% | 0 |

FIG. 25

| ADMINISTRATOR ID | REPLACEMENT UNIT | SECTION C#1 ($20 \geq E > 13$) | SECTION C#2 ($13 \geq E > 7$) | SECTION C#3 ($7 \geq E$) |
|---|---|---|---|---|
| #ABC | FEEDING ROLLER | 0 | 1 | 2 |
| | FIXING DEVICE | 1 | 0 | 1 |
| | SECONDARY TRANSFER ROLLER | 0 | 0 | 2 |
| | TOTAL | 1 | 1 | 5 |
| | RATIO | 14.5% | 14.5% | 71% |

INFORMATION PROCESSING APPARATUS FOR ANALYZING CONDITION OF DEVICE

BACKGROUND OF THE INVENTION

Field of the Invention

The present invention relates to an information processing apparatus that analyzes a condition of a device.

Description of the Related Art

A system for notifying a user or a dealer of the necessity of maintenance by analyzing an operation history of an image forming apparatus or device has been proposed. Japanese Patent No. 3831143 discloses a configuration in which an operation history of an image forming apparatus is transmitted to a server, and diagnosis is performed in the server. Also, Japanese Patent Laid-Open No. 2021-071657 discloses a configuration in which an operation history of an image forming apparatus is analyzed in a server based on analysis rules, a user of the image forming apparatus is notified of a necessary action such as a timing of replacement of a component, and the appropriateness of the content of the action is determined to correct the analysis rules. Japanese Patent Laid-Open No. 2007-133307 discloses a configuration in which a threshold for determining whether or not the image forming apparatus is in a condition requiring maintenance is set in advance.

When an operation history is analyzed in an information processing apparatus such as a server, resources (storage, memory, execution time, and the like) are consumed. Therefore, if the analysis is performed more than necessary, the operation cost of the information processing apparatus increases.

Also, as described in Japanese Patent Laid-Open No. 2007-133307, when the necessity for maintenance is determined by a preset threshold, it may not be possible to respond to changes in actual printing amounts or usage of the image forming apparatus and it may not be possible to notify the need for maintenance at the appropriate timing.

SUMMARY OF THE INVENTION

According to an aspect of the present invention, an information processing apparatus includes: one or more processors; and one or more memories storing one or more computer programs. The one or more computer programs, when executed by the one or more processors, cause the information processing apparatus to function as: a reception unit configured to receive history information, from a device, indicating an operation history of a predetermined operation in the device; an analysis unit configured to analyze a condition of the device based on the history information in a case where an execution condition is satisfied; and a setting unit configured to set the execution condition, and wherein the setting unit sets the execution condition based on an analysis result by the analysis unit.

Further features of the present invention will become apparent from the following description of exemplary embodiments with reference to the attached drawings.

BRIEF DESCRIPTION OF THE DRAWINGS

FIG. 4 is a schematic configuration diagram of an image forming system according to an embodiment.

FIG. 6A to FIG. 6C are views illustrating exemplary information stored in a server in an embodiment.

FIG. 9A and FIG. 9B are views illustrating exemplary information stored in the server in an embodiment.

FIG. 11A and FIG. 11B are views illustrating exemplary information stored in the server in an embodiment.

FIG. 13 is a functional block diagram of the image forming system according to an embodiment.

FIGS. 15A and 15B are views illustrating exemplary information stored in the server in an embodiment.

FIG. 16 is a view illustrating an example of a screen displayed by a host computer according to an embodiment.

FIGS. 17A and 17B are explanatory diagrams of processing executed by the server according to an embodiment.

FIG. 20A and FIG. 20B are views illustrating exemplary information stored in the server in an embodiment.

FIG. 21A and FIG. 21B are views illustrating an example of screens displayed by a host computer according to an embodiment.

FIG. 22 is an explanatory diagram of processing executed by the server according to an embodiment.

FIG. 25 is an explanatory diagram of processing executed by the server according to an embodiment.

DESCRIPTION OF THE EMBODIMENTS

Figure 1:
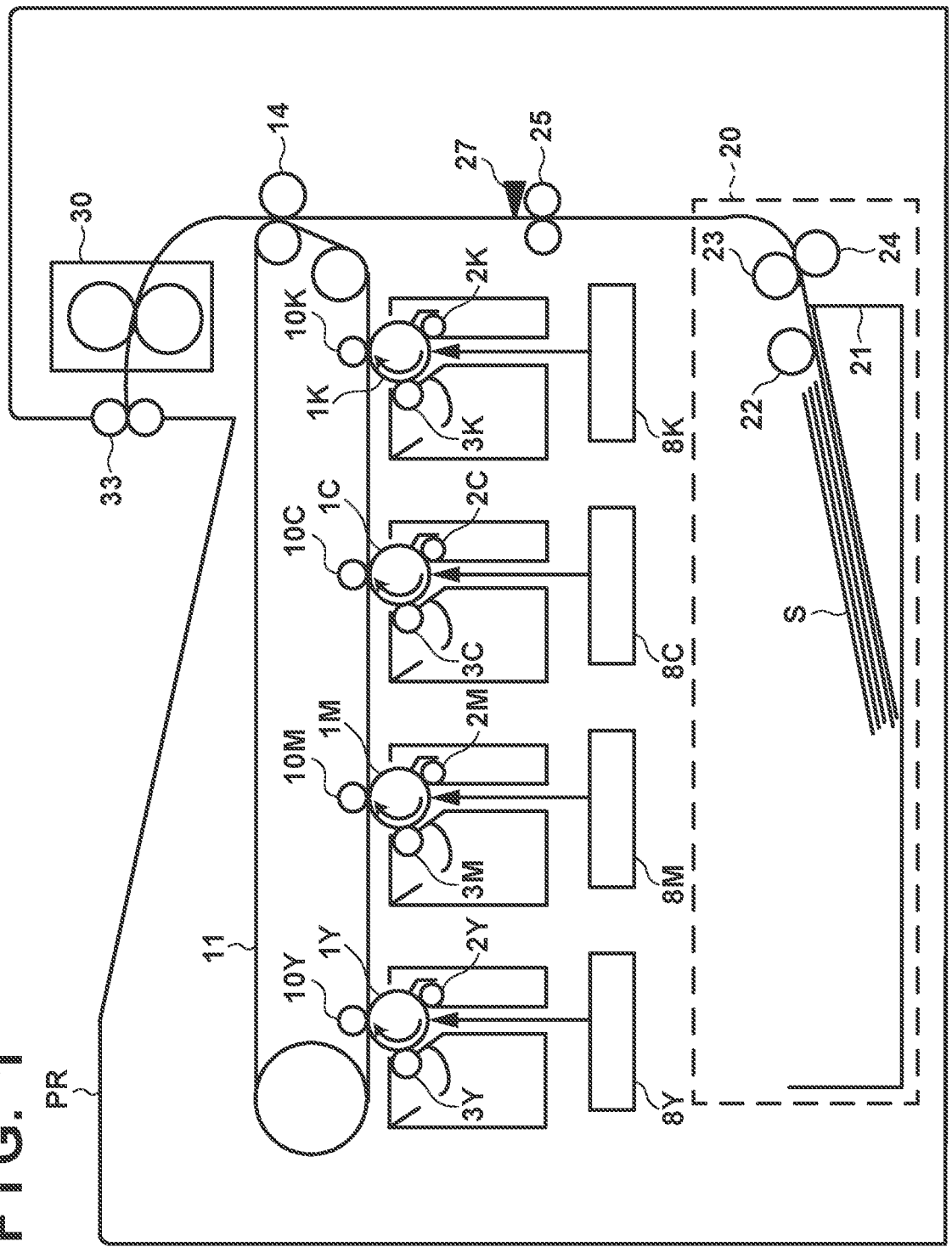
FIG. 1 is a schematic cross-sectional view of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a schematic configuration diagram of an image forming apparatus PR according to the present embodiment.

The letters Y, M, C, and K at the end of a reference numeral in FIG. 1 indicate that the color of the toner image in which the member indicated by the reference numeral is involved in formation is yellow, magenta, cyan, and black, respectively. In the following description, reference numerals excluding the letters Y, M, C, and K at the end are used when it is not necessary to distinguish colors.

A photosensitive member 1 is rotationally driven in the clockwise direction in the diagram at the time of image formation. A charging roller 2 is set to a charging potential, and charges the corresponding photosensitive member 1 to a predetermined potential. A scanning unit 8 scans and exposes the corresponding photosensitive member 1 with light to form an electrostatic latent image on the corresponding photosensitive member 1. A developing roller 3 is set to a developing potential, and develops the electrostatic latent image of the corresponding photosensitive member 1 with toner, thereby forming a toner image on the corresponding photosensitive member 1. A primary transfer roller 10 is set to a primary transfer potential, and transfers the toner image of the corresponding photosensitive member 1 to an intermediate transfer belt 11. Note, by transferring the toner images of the respective photosensitive member 1 onto the intermediate transfer belt 11 in a superimposed manner, colors different from those of yellow, magenta, cyan, and black can be reproduced. The intermediate transfer belt 11 is rotationally driven in the counter-clockwise direction in the diagram at the time of image formation. As a result, the toner image transferred to the intermediate transfer belt 11 is conveyed to a position facing a secondary transfer roller 14.

A feeding unit 20 feeds a sheet S stored in a cassette 21 to a conveyance path provided in an image forming apparatus PR. The sheet S fed to the conveyance path is conveyed to the opposite position of the secondary transfer roller 14 by a registration roller pair 25. The secondary transfer roller 14 is set to the secondary transfer potential and transfers the toner image of the intermediate transfer belt 11 to the sheet S. The sheet S on which the toner image has been transferred is conveyed to a fixing device 30. The fixing device 30 fixes the toner image on the sheet S by heating and pressurizing the sheet S. After fixing the toner image, the sheet S is discharged to the outside of the image forming apparatus PR by a discharge roller pair 33. Note, a conveyance path sensor 27 for detecting the sheet S is provided downstream of the registration roller pair 25.

Figure 2A:
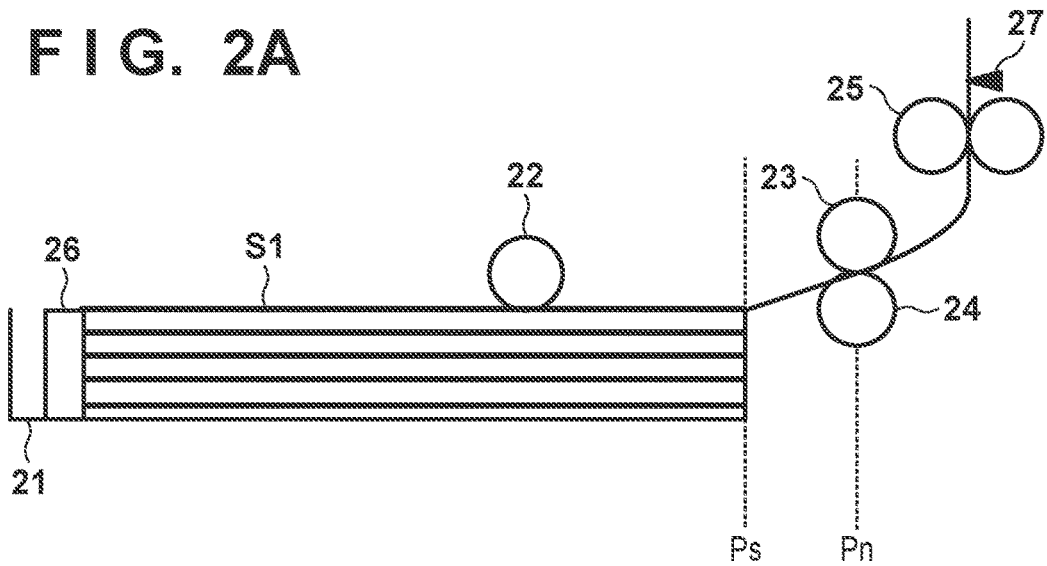
FIG. 2A to FIG. 2C are explanatory diagrams of a configuration of a feeding unit according to an embodiment.
Figure 2B:
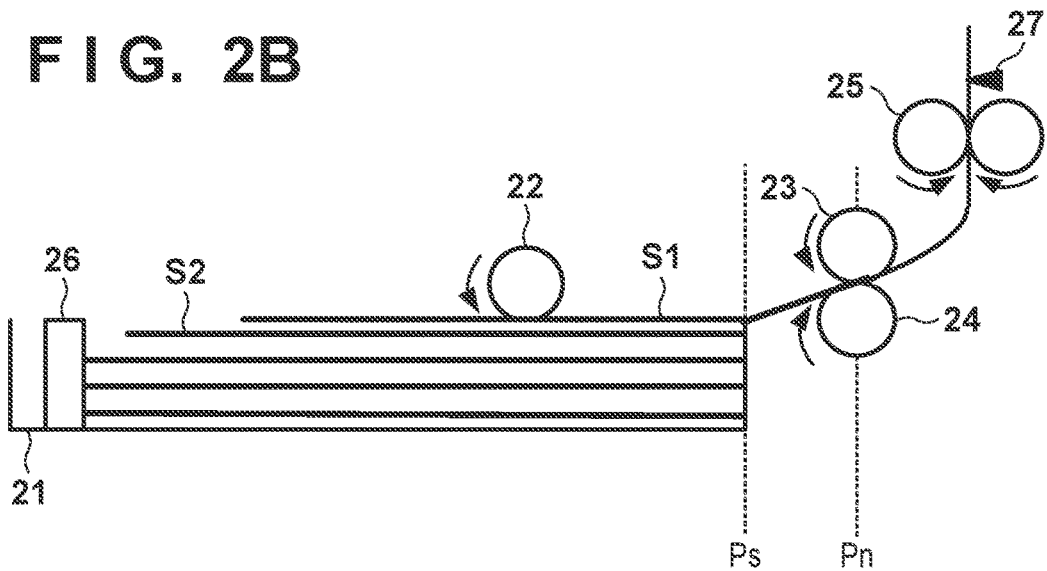
Figure 2C:
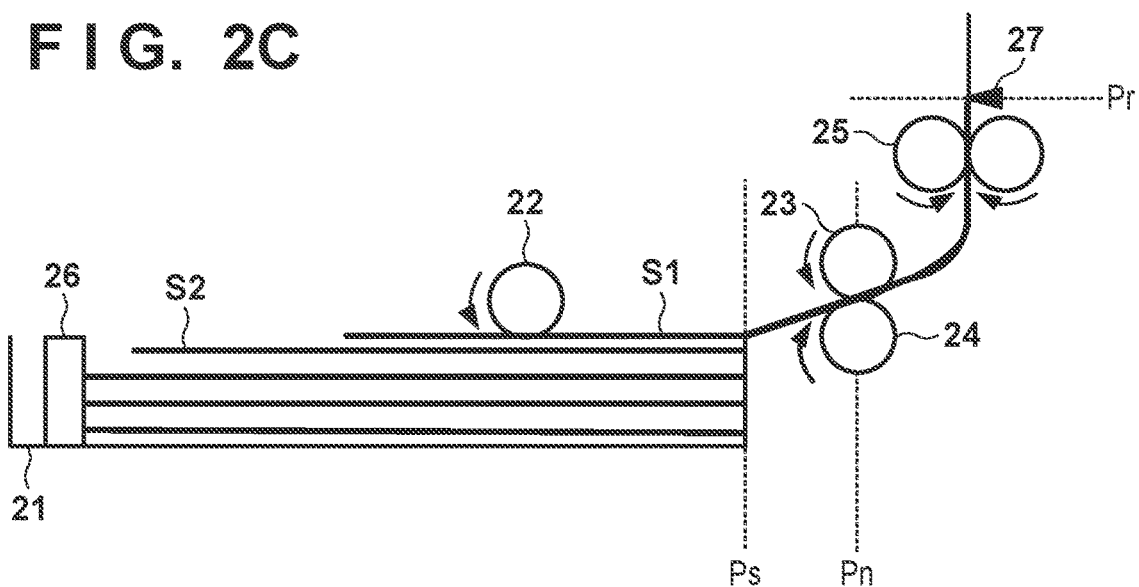

Next, a description regarding the details of the feeding unit 20 is given with reference to the FIGS. 2A to 2C. FIG. 2A shows the feeding unit 20 and a state of its vicinity at a timing of starting the feeding of a sheet S1 located at the uppermost position accommodated in the cassette 21. Within the cassette 21, the position of the sheet S in the conveyance direction is regulated by a trailing end regulating plate 26. At this time, the leading end of the sheet S in the conveyance direction is at a position of Ps shown in FIG. 2A. When a feed roller 22 and a conveyance roller 23 are rotated by starting the feeding operation, the sheet S1 starts moving rightward in FIG. 2A due to the frictional force with the feed roller 22. Thereafter, as shown in FIG. 2B, the sheet S1 reaches a separation nip Pn formed by the conveyance roller 23 and a separation roller 24. In FIG. 2B, a sheet S2 under the sheet S1 is also moved by the frictional force between the sheet S1 and the sheet S2. The separation nip Pn is configured to feed only the uppermost sheet S1 to the downstream side when two or more sheets S are fed to the separation nip Pn by the feed roller 22.

Specifically, a torque limiter (not shown) is connected to the separation roller 24, and a torque as a resistance force is applied in a direction opposite to the conveyance direction of the sheet S1. This torque is set such that when only one sheet S enters the separation nip Pn, the separation roller 24 rotates following the conveyance roller 23, but stops when two sheets S enter the separation nip Pn. Therefore, sheets S are conveyed to the downstream side one at a time by the separation nip Pn.

Even after the leading end of the sheet S1 passes through the separation nip Pn, the sheet S1 passes through the registration roller pair 25 by rotation of the feed roller 22 and the conveyance roller 23, and the sheet S1 reaches the detection position Pr of the conveyance path sensor 27 as shown in FIG. 2C. The time from the start timing of the feeding operation shown in FIG. 2A to the time when the leading end of the sheet S1 reaches the detection position Pr of the conveyance path sensor 27 is hereinafter referred to as a feeding time.

Figure 3A:
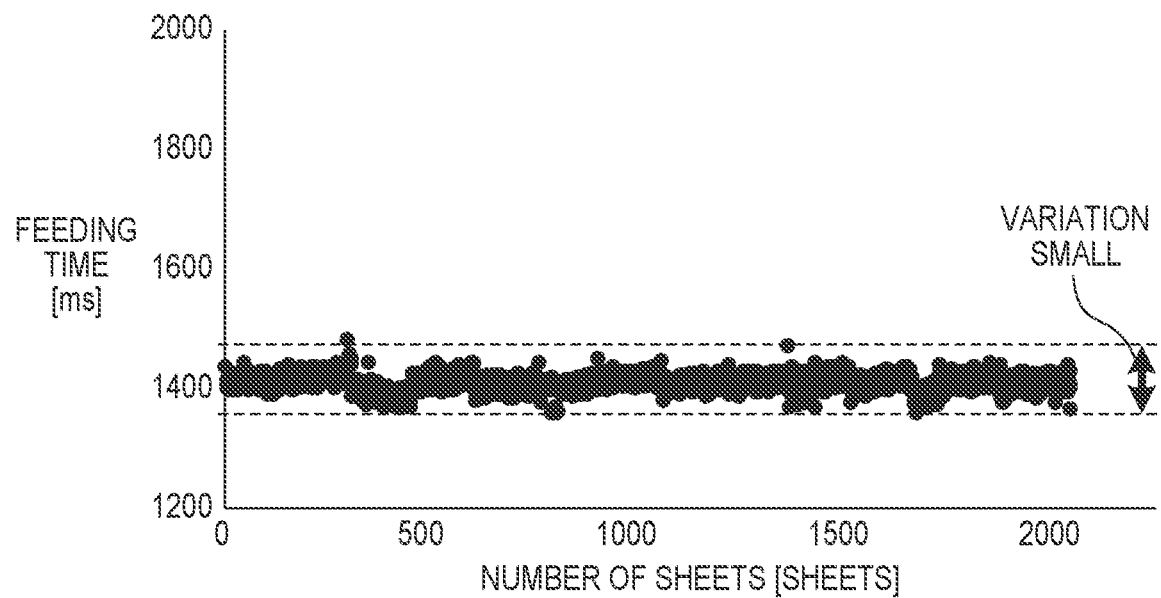
FIG. 3A and FIG. 3B are views illustrating the relationship between the number of images formed and the feeding times thereof.
Figure 3B:
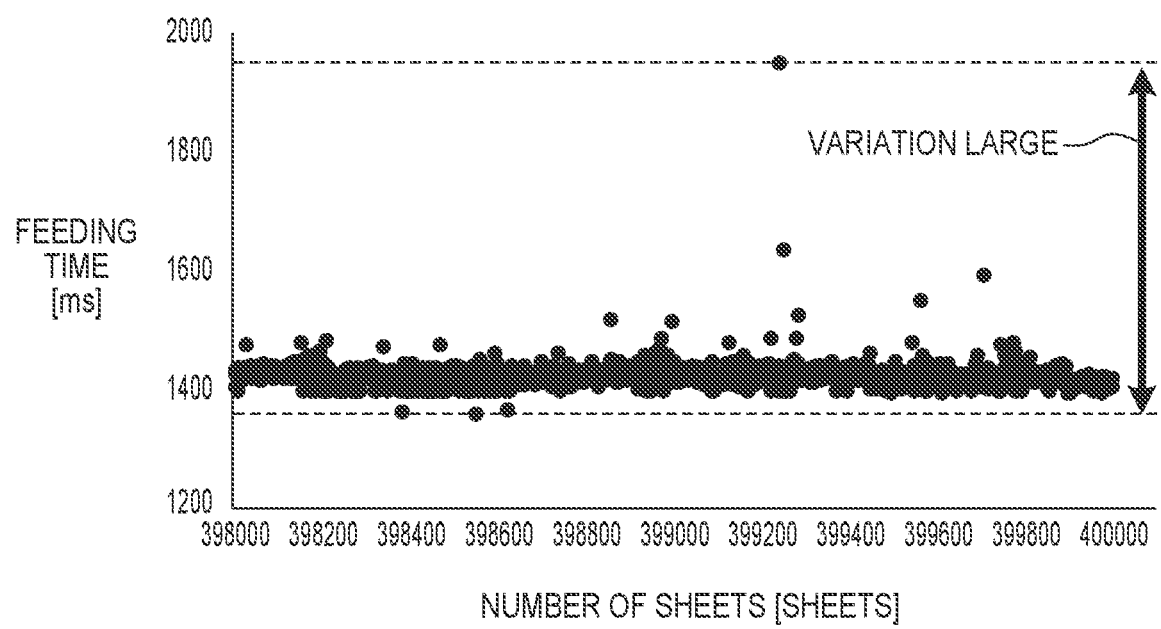

FIG. 3A and FIG. 3B show the feeding times when feeding operations for 400,000 sheets are repeated. Note that FIG. 3A shows the feeding time of the first 2000 feeding operations, and FIG. 3B shows the feeding time of the last 2000 feeding operations. As shown in FIG. 3A and FIG. 3B, when the number of repetitions of the feeding operation increases, a sudden delay of the feeding time sporadically occurs, and the variation of the feeding time increases. This is considered to be mainly caused by the fact that, by repeating the feeding operations, the feed roller 22 wears down and the frictional force between the feed roller 22 and the sheet S is reduced at a place where the degree of wear is large.

FIG. 4 is a configuration diagram of an image forming system that includes the image forming apparatus PR according to the present embodiment. As illustrated in FIG. 4, a host computer HC, the image forming apparatus PR, and a server SV, which is an information processing apparatus, are configured to be able to communicate with each other via, for example, a network. A control unit 201 of the host computer HC includes a CPU that is a processor, and executes a control program stored in a storage apparatus (not shown) to perform various processing described below. An operation display unit 202 includes a display, a keyboard, a mouse, and the like, and provides a user interface. For example, the control unit 201 transmits a print job including image data to the image forming apparatus PR in response to a user operation on the operation display unit 202, and causes the image forming apparatus PR to form an image based on the image data.

The video controller 85 of the image forming apparatus PR performs communication processing with the host computer HC and the server SV. When a print job is received from the host computer HC, the video controller 85 controls image formation based on the print job by the printer engine 84. An operation display unit 86 includes an operation panel, operation buttons, or the like, and provides a user interface. The printer engine 84 includes an engine control unit 87 that includes a CPU 80 that is a processor, a ROM 81, and a RAM 82. The ROM 81 is a non-volatile memory that holds and stores control programs and various types of data. Note that a rewritable nonvolatile memory may be used instead of the ROM 81. The CPU 80 executes a control program stored into the ROM 81 to control the respective members illustrated in FIG. 1 via the IO port 83 to form images on the sheet S. Note that a motor 28, which is a member not shown in FIG. 1, is a driving source for rotating the conveyance roller 23 and the separation roller 24. A solenoid 29, which is not shown in FIG. 1, is a driving source for rotating the feed roller 22.

A calculation unit 301 of the server SV includes one or more processors (CPUs) and performs various kinds of processing by executing a control program stored in the storage apparatus 302. A storage apparatus 302 includes any volatile and non-volatile storage device. The storage apparatus 302 stores not only a program executed by the calculation unit 301 but also data used by the calculation unit 301 in various processing. In the present embodiment, the storage apparatus 302 is a component of the server SV, but some or all of the data described below as being stored in the storage apparatus 302 may be stored in an external device that can be accessed by the server SV via a network.

Figure 5:
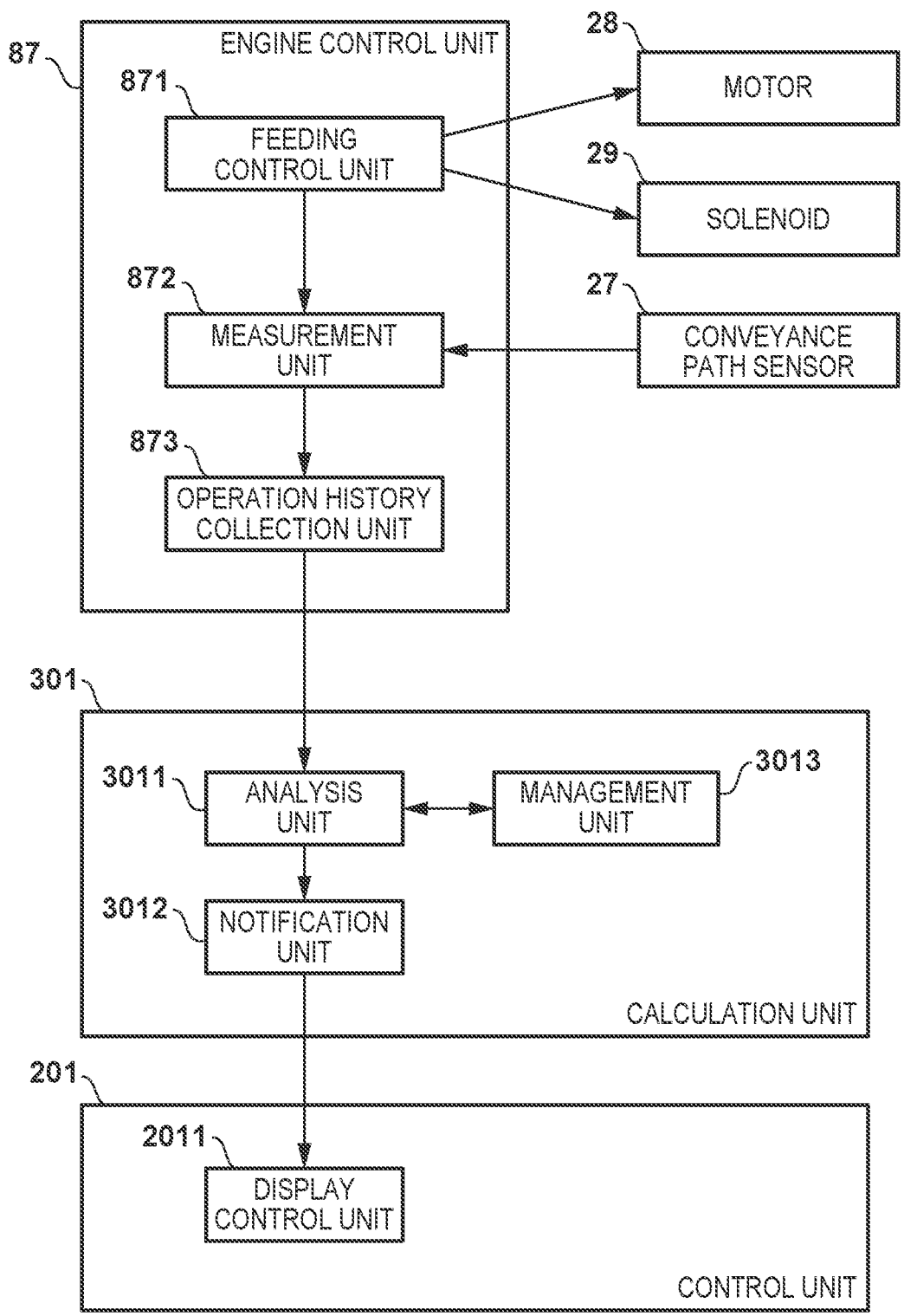
FIG. 5 is a functional block diagram of the image forming system according to an embodiment.

FIG. 5 is a functional block diagram in the present embodiment of the system shown in FIG. 4. Note that the functional blocks illustrated in FIG. 5 can be realized by the CPU 80 of the engine control unit 87 of the image forming apparatus PR, the CPU of the calculation unit 301 of the server SV, and the CPU of the control unit 201 of the host computer HC each executing corresponding control programs.

A feeding control unit 871 controls the motor 28 and the solenoid 29 to perform feeding control of the sheet S. The feeding control unit 871 notifies a measurement unit 872 of the feeding start timing of the sheet S. The measurement unit 872 measures a feeding time based on the detection timing of the leading end of the sheet S notified from the conveyance path sensor 27. The measurement unit 872 stores the measured feeding time into the RAM 82 together with the timing (hereinafter referred to as a measurement timing) at which the feeding time was measured.

The measurement timing may be, for example, a feed start timing or a detection timing. An operation history collection unit 873 transmits the measurement timing and the feeding time at the measurement timing, which are stored into the RAM 82, to the server SV as history information.

Upon receiving the history information, the server SV stores the received history information in the storage apparatus 302. FIG. 6A illustrates one example of history information according to the present embodiment. When a predetermined execution condition is satisfied, an analysis unit 3011 obtains the variance value V of the feeding time of the latest X number of sheets S from the history information stored in the storage apparatus 302. For example, X=1000 is possible. The storage apparatus 302 holds the determination information shown in the FIG. 6B. Based on the determination information, the analysis unit 3011 analyzes and determines the condition of the feeding unit 20 due to the wear of the feed roller 22 based on the variance value V. In the example of FIG. 6B, a degree of good-condition of the feeding unit 20 is classified into four stages based on the variance value V. Note, the analysis results of FIG. 6B show that the smaller the number, the higher the degree of good-condition of the feeding unit 20. In other words, the smaller the variance value, that is, the smaller the variation in feeding time, the higher the degree of good-condition of the feeding unit 20 is determined to be in the present embodiment. Note, in the example of FIG. 6B, the degree of good-condition of the feeding unit 20 is classified into four stages, but it may be classified into two stages, three stages, or five stages or more. The analysis unit 3011 stores the analysis result (determination result) in the storage apparatus 302 in association with the measurement timing used to calculate the variance value V. Note that the associated measurement timing may be the last timing, the first timing or both of those timings of a plurality of measurement timings used to calculate the variance value V. Note, the analysis result is not limited to the variance value V, and the value of the standard deviation, the difference between the longest feeding time and the shortest feeding time, and the like may be used instead.

When the number of the analysis result obtained by the analysis unit 3011 is higher than a predetermined value, the notification unit 3012 transmits a message indicating that an action for the feeding unit 20 is necessary to the host computer HC. In other words, when the condition of the feeding unit 20 is lower than a predetermined stage, the notification unit 3012 transmits a message indicating that an action for the feeding unit 20 is necessary to the host computer HC. For example, in a case where the evaluation is performed in four stages as shown in FIG. 6B, when the degree of good-condition of the feeding unit 20 is "4", which is the lowest stage, the notification unit 3012 may transmit a message indicating that the feeding unit 20 needs to be replaced to the host computer HC. The display control unit 2011 of the host computer HC displays the contents of the message received from the notification unit 3012 on the operation display unit 202.

The management unit 3013 of the calculation unit 301 sets the condition for executing the analysis by the analysis unit 3011. In the present embodiment, the management unit 3013 sets the execution condition using the latest analysis result performed by the analysis unit 3011. Therefore, the setting conditions shown in FIG. 6C are stored in the storage apparatus 302 of the server SV. As shown in FIG. 6C, the setting conditions are set such that the lower the degree of good-condition of the feeding unit 20 becomes, the higher the frequency of executing the analysis becomes. For example, according to FIG. 6C, when the analysis result by the analysis unit 3011 is "1" or "2", the next analysis is performed after one month. On the other hand, when the analysis result by the analysis unit 3011 is "4", the next analysis is performed on the next day. Note that, although the initial value of an execution condition is arbitrary, it can be a condition with the highest execution frequency, for example, "every day". Furthermore, rather than setting the execution condition based on only the latest analysis result, configuration so as to set the execution condition based on the analysis results of the past several times is also possible.

Figure 7:
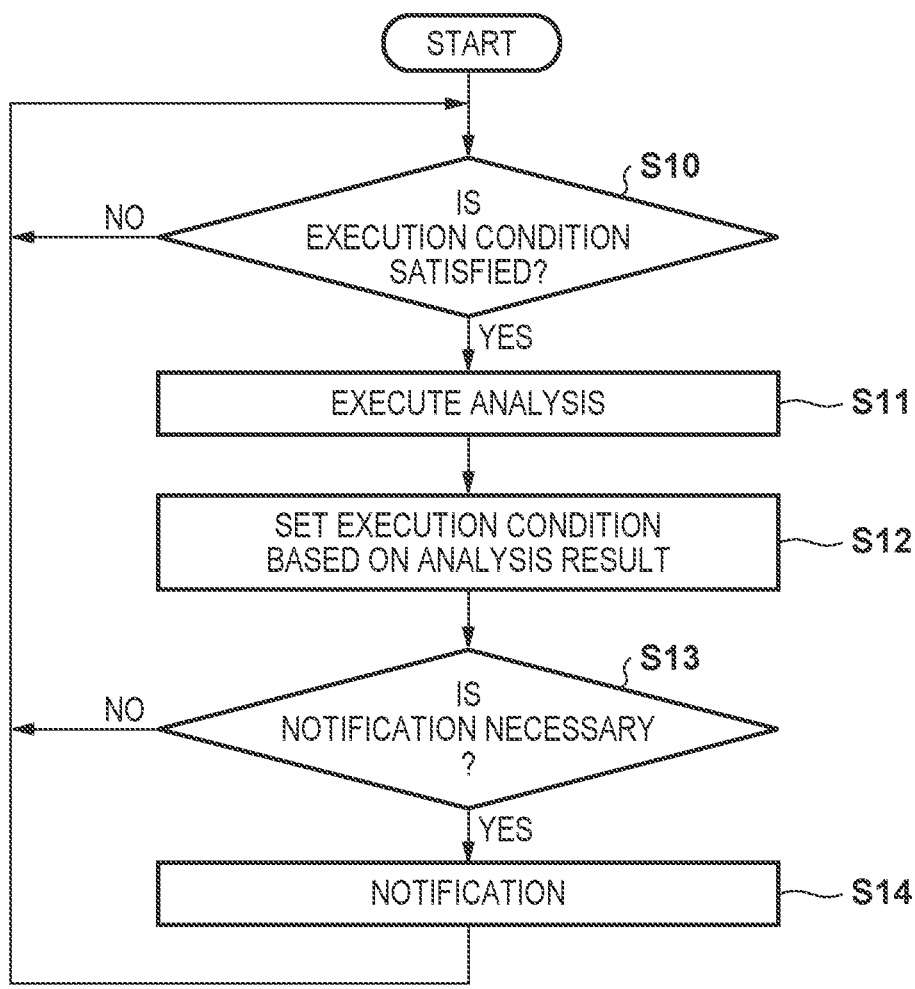
FIG. 7 is a flowchart of processing executed by the server according to an embodiment.

FIG. 7 is a flowchart of processing executed by the calculation unit 301 of the server SV. The analysis unit 3011 waits until the execution condition is satisfied in step S10. When the execution condition is satisfied, the analysis unit 3011 in step S11 executes the analysis based on the history information stored in the storage apparatus 302. The analysis unit 3011 stores the analysis result into the storage apparatus 302. In step S12, the management unit 3013 sets the execution condition based on the analysis result in step S11. Note, rather than setting an execution condition based on only the latest analysis result, configuration so as to set the execution condition based on the analysis results of the past several times is also possible. In step S13, the notification unit 3012 determines whether or not the analysis result in step S11 needs to notify the host computer HC of an action to be performed on the image forming apparatus PR. If the notification is necessary, the notification unit 3012 notifies the host computer HC of the content of the action in step S14. Thereafter, the process is repeated from step S10. Note, if the notification to the host computer HC is not necessary, the process is repeated from step S10.

In the present embodiment, the image forming apparatus PR includes one feeding unit 20, but may also include a plurality of feeding units 20. In this case, the condition is analyzed for each feeding unit 20. Further, in the present embodiment, the target of analysis is the feeding operation of the feeding unit 20, more specifically, the feeding unit 20 of the image forming apparatus PR, but the target of analysis is not limited to this. For example, the conveyance operation of the sheet S can be an analysis target. In this case, instead of the feeding time in the present embodiment, the analysis is performed using the conveyance time, which is the time taken for the sheet S to be conveyed in a predetermined section of the conveying path. Note, the feeding time can be regarded as the conveyance time of a section from the start position of the conveyance path to the detection position of the conveyance path sensor 27. Further, any replaceable member such as the fixing device 30 and the intermediate transfer belt 11 can be used as the analysis target. Furthermore, the device or apparatus to be analyzed is not limited to the image forming apparatus PR, and any replacement part of any apparatus/device can be analyzed. For example, the apparatus to be analyzed may be an image reading apparatus. Further, the apparatus/device to be analyzed may be a sheet conveyance device that conveys a sheet, or an apparatus that includes a sheet conveyance device. Further, the device to be analyzed may be a feeding device that feeds a sheet to an apparatus such as an image forming apparatus or an image reading apparatus. Furthermore, the apparatus to be analyzed may be an apparatus that includes a feeding device. Please note that, in the embodiments, a term "device" and a term "apparatus" are used interchangeably Further, in the present embodiment, an execution condition is specified as a time period until the next analysis is executed, but an execution condition based on any value by which the frequency at which the analysis is executed can be adjusted may be used. For example, the execution condition can be specified by the number of fed sheets S. In other words, the execution condition can be specified by the number of times a predetermined operation was performed. In a case where the execution condition is specified by the number of sheets S fed, the next analysis is executed when the number of sheets S specified by the execution condition is fed after the analysis is executed. In the present embodiment, the notification unit 3012 notifies the host computer HC. Alternatively, or in addition to this, configuration may be taken so that the image forming apparatus PR is notified.

As described above, based on the operation history of the predetermined operation in the device, the degree of good-condition of the device, more specifically, the degree of good-condition of the replacement part related to a predetermined operation in the device, is analyzed and evaluated in two or more stages. Then, the execution condition of the analysis is set based on the analysis result. Here, a first execution condition is set when the degree of good-condition is a first stage, and a second execution condition is set when the degree of good-condition is a second stage higher than the first stage. As illustrated in FIG. 6C, the execution frequency of the analysis based on the second execution condition is made less than the execution frequency of the analysis based on the first execution condition. With this configuration, it is possible to prevent an unnecessary analysis from being performed in the server SV, and to suppress an increase in operation cost.

Second Embodiment

Figure 8:
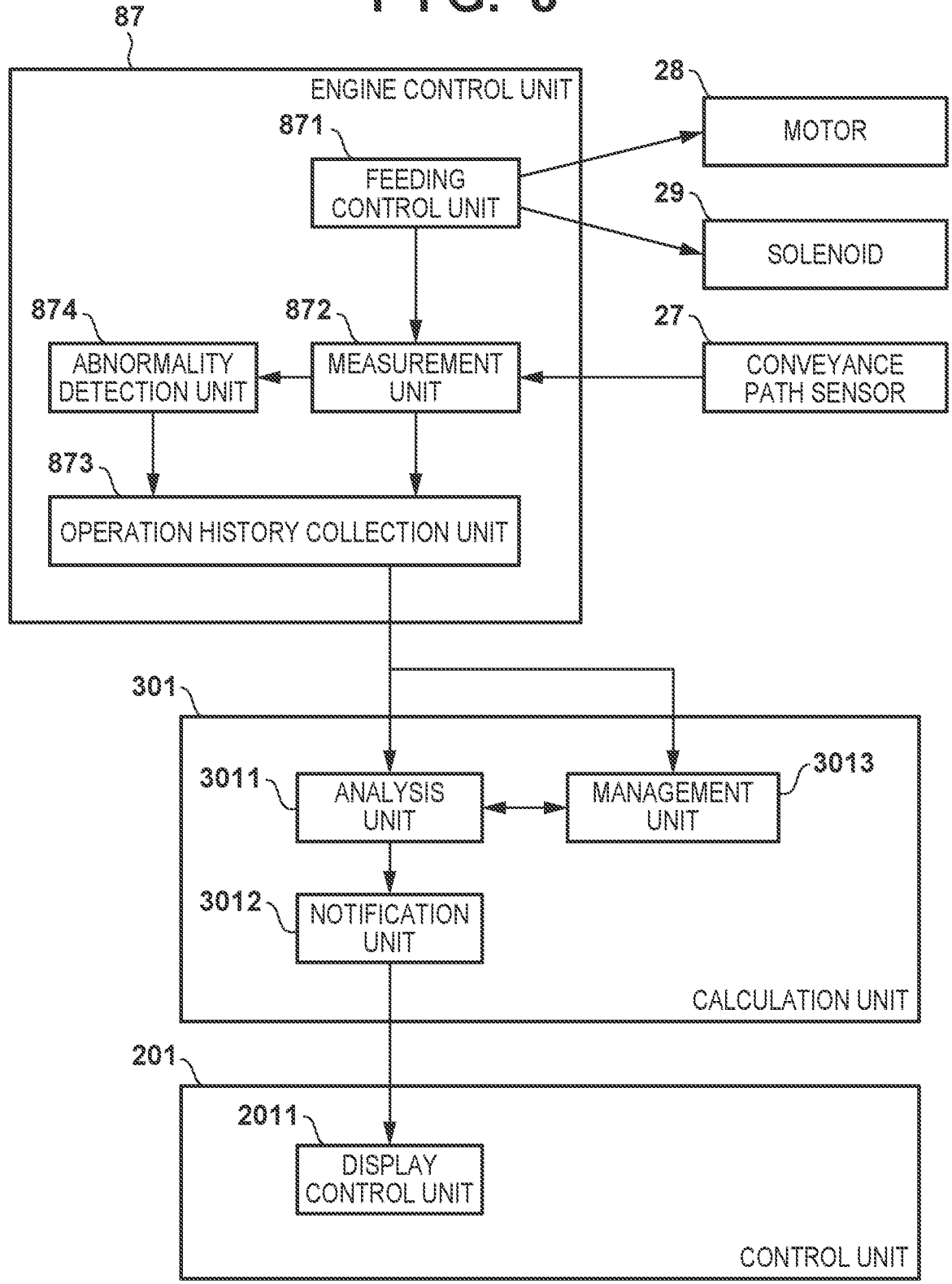
FIG. 8 is a functional block diagram of the image forming system according to an embodiment.

The following describes a second embodiment mainly about differences from the first embodiment. FIG. 8 is a functional block diagram in the present embodiment of the system shown in FIG. 4. An abnormality detection unit 874 determines that a conveyance abnormality has occurred when the feeding time measured by the measurement unit 872 is equal to or larger than a threshold $\alpha$. The information indicating the threshold $\alpha$ is stored in advance into the ROM 81. In this example, $\alpha=1800$. Also, the abnormality detection unit 874 associates the information (hereinafter, referred to as an abnormality detection result) of whether or not a conveyance abnormality had occurred with the measurement timing and stores this into the RAM 82.

An operation history collection unit 873 includes information indicating an abnormality detection result at the measurement timing in the history information.

In the present embodiment, FIG. 9A shows one example of history information stored in the storage apparatus 302 by the server SV. As shown in FIG. 9A, the feeding time at 21:5:30 on Mar. 4, 2020 is 1856 ms, and the threshold value $\alpha=1800$ in this example is exceeded. Therefore, the abnormality detection result of the record is "Yes".

In the present embodiment, the management unit 3013 obtains, based on the history information, the number of times that the conveyance abnormality is detected in the feeding of the latest Y number of sheets S. For example, Y=1000 is possible. Then, the management unit 3013 sets the execution condition based on the setting information shown in the FIG. 9B. As shown in FIG. 9B, in the present embodiment, the setting information is set so that the frequency of executing the analysis increases as the number of times an abnormality is detected in a predetermined number of sheets in the past increases.

In the present embodiment, a flowchart of a first process executed by the calculation unit 301 of the server SV in which step S12 of FIG. 7 is omitted is given. The first process includes an analysis by the analysis unit 3011, determination of whether or not a notification is necessary by the notification unit 3012, and a notification in a case where notification is necessary. On the other hand, the management unit 3013 sets and updates the execution condition based on the setting information at an update timing. The update timing may be a timing at which the analysis unit 3011 performs the analysis. Alternatively, the update timing may be a timing at which the history information regarding one sheet S is received. Alternatively, the update timing may be a timing at which history information regarding Y1 number of sheets S is received. Note, Y1<Y is possible. For example, when Y=1000 and Y1=100, the management unit 3013 sets the execution condition based on the history information of the past 1000 sheets when it receives history information of 100 sheets S since the last time the execution condition was updated. Also, the update timing may be every predetermined period.

As described above, in the present embodiment, the execution frequency of the analysis decreases as the number of times an abnormality is detected in a predetermined operation of a predetermined number of times in the past decreases. Note that the predetermined operation in the present embodiment is a feeding operation. With this configuration, it is possible to prevent an unnecessary analysis from being performed in the server SV, and to suppress an increase in operation cost. Note, in the present embodiment, the management unit 3013 sets the execution condition based on the number of times an abnormality is detected for the latest Y sheets, but configuration may be taken to set the execution condition based on the number of times an abnormality is detected in the previous predetermined period. Further, configuration may be taken so that the execution condition is set based on an operation history such as the type of the sheet S or the environmental temperature and humidity.

Third Embodiment

Figure 10:
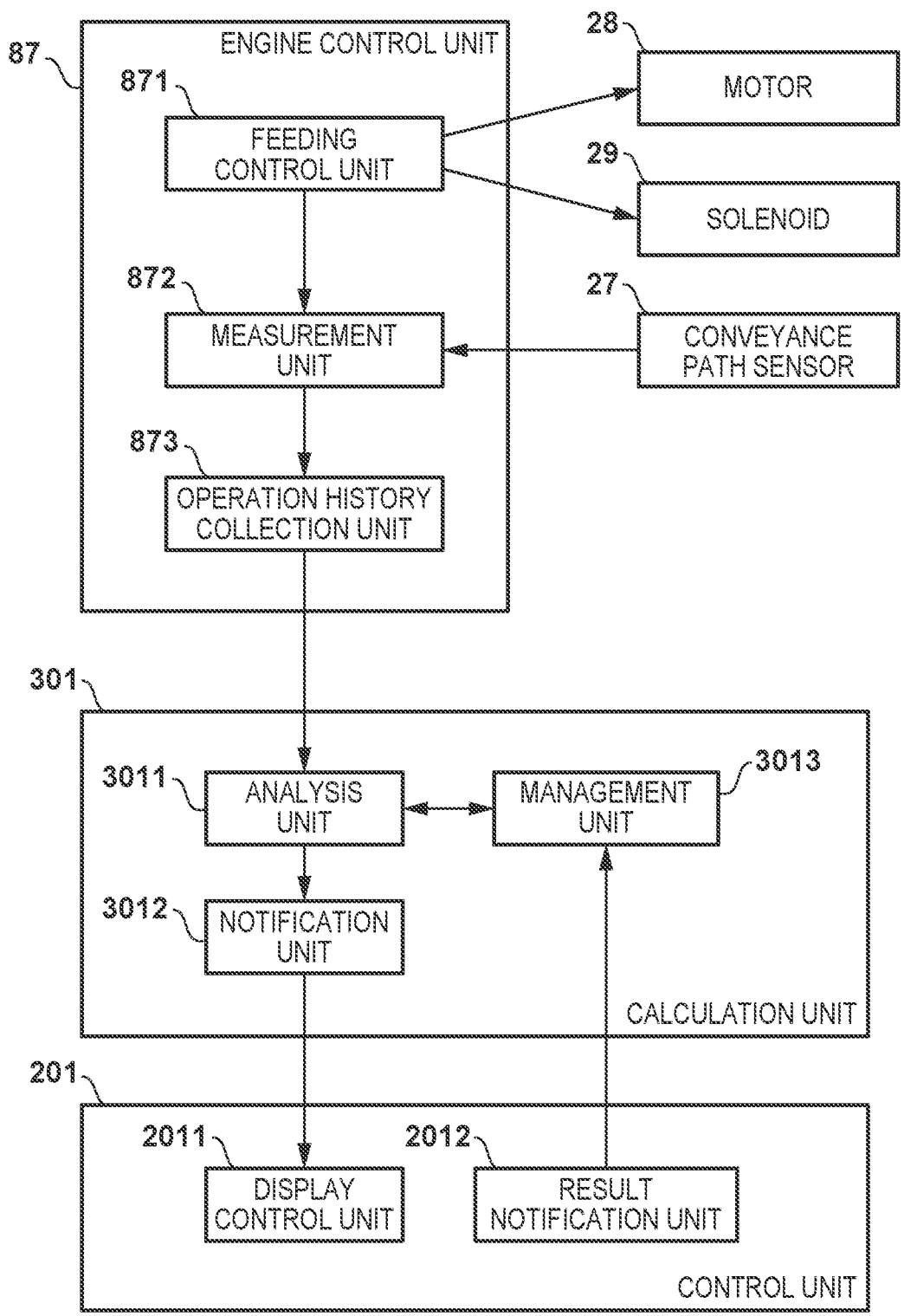
FIG. 10 is a functional block diagram of the image forming system according to an embodiment.

The following describes a third embodiment mainly about differences from the first embodiment. FIG. 10 is a functional block diagram in the present embodiment of the system shown in FIG. 4. As in the first embodiment, the display control unit 2011 of the host computer HC displays a necessary action in accordance with the message notified from the notification unit 3012. In the present embodiment, the display control unit 2011 displays options for an execution/no execution of an action or the result thereof, and allows the user to make a selection. For example, the display control unit 2011 displays the four options shown in "feedback contents" in FIG. 11A and allows the user make a selection. A result notification unit 2012 feeds back the selection result by the user to the management unit 3013.

When the selection result is fed back, the management unit 3013 sets and updates the execution condition based on the setting information shown in the FIG. 11A. As shown in FIG. 11A, when the user determines that a problem has been solved by the action notified by the notification unit 3012, the frequency of executing the analysis is set to be lower than other cases. Note, the options to be displayed and selected by the user are not limited to those shown in FIG. 11A.

Figure 12:
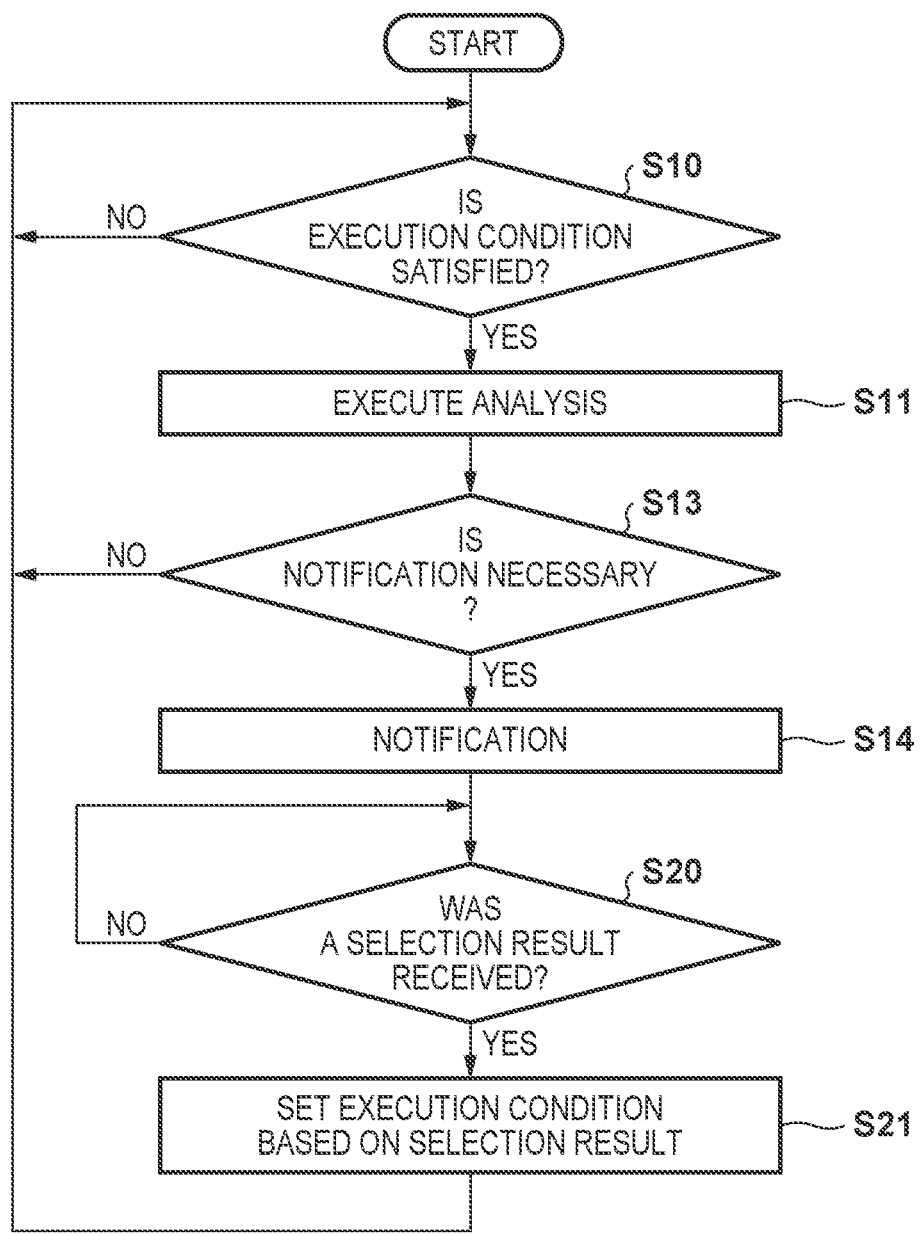
FIG. 12 is a flowchart of processing executed by the server according to an embodiment.

FIG. 12 is a flowchart of processing executed by the calculation unit 301 of the server SV in the present embodiment. Note that the same processing steps as those in the first embodiment are given the same step numbers, and the description thereof is omitted. As in the second embodiment, when the analysis unit 3011 executes the analysis in step S11, the notification unit 3012 determines whether or not the notification is necessary in step S13, and in a case where the notification is necessary, notifies the host computer HC of content of the action in step S14. Thereafter, in step S20, the management unit 3013 waits for feedback of the selection result of the options from the result notification unit 2012 of the host computer HC. When the selection result is fed back, the management unit 3013 sets the execution condition based on the fed back option in step S21. Note that, in step S20, if the selection result is not received from the result notification unit 2012 even after a predetermined period of time has elapsed, configuration may be taken so that the processing is advanced to step S21 assuming that the option "action not executed" is selected.

Note, in FIG. 11A, in a case where the user executes the action as instructed and the problem is solved, the frequency of executing the analysis is lowered compared to otherwise. However, configuration may be such that the degree of improvement of the problem is evaluated by the user in two or more stages, and the higher the degree of improvement is, based on the evaluation result of the user, the lower the execution frequency of the analysis is made to be. Further, for example, configuration may be taken so that the standby time in step S20 is used to set the execution condition.

As described above, in the present embodiment, the execution condition is set based on an execution/no execution of the action based on the content of an action notified to the user and the degree of improvement of the problem in the case where the action is actually executed. Note, the frequency of the analysis is made lower as the degree of improvement by performing the action is made higher. With this configuration, it is possible to prevent an unnecessary analysis from being performed in the server SV, and to suppress an increase in operation cost.

Fourth Embodiment

The following describes a fourth embodiment mainly about differences from the first embodiment. FIG. 13 is a functional block diagram in the present embodiment of the system shown in FIG. 4. In the present embodiment, the user operates the display control unit 2011 to perform user input for selecting the execution frequency of the analysis by the analysis unit 3011. For example, as shown in FIG. 11B, a user may perform a user input to select one option of low, medium, or high frequency. The user can select the execution frequency in consideration of the installation environment of the image forming apparatus PR, other individual circumstances, and the like. A frequency notification unit 2013 notifies the management unit 3013 of the execution frequency selected by the user based on the user input.

When the management unit 3013 obtains the result of the user input, in other words, when the user selects the execution frequency, the management unit 3013 sets and updates the execution condition based on the configuration information shown in FIG. 11B. Note that in FIG. 11B, the frequency of execution is classified into three stages, but may be classified into two or more arbitrary stages.

In the present embodiment, a flowchart of a first process executed by the calculation unit 301 of the server SV in which step S12 of FIG. 7 is omitted is given, similar to the second embodiment. On the other hand, when the frequency of selection of the user is notified from the frequency notification unit 2013, the management unit 3013 sets and updates the execution condition based on the notified frequency of selection.

As described above, in the present embodiment, the user selects the execution frequency. As a result, it is possible to prevent unnecessary analyses from being performed for the user. Note that, for example, a configuration may be taken in which an operation cost acceptable to the user is selected and the execution condition is set based on the operation cost.

Fifth Embodiment

Figure 14:
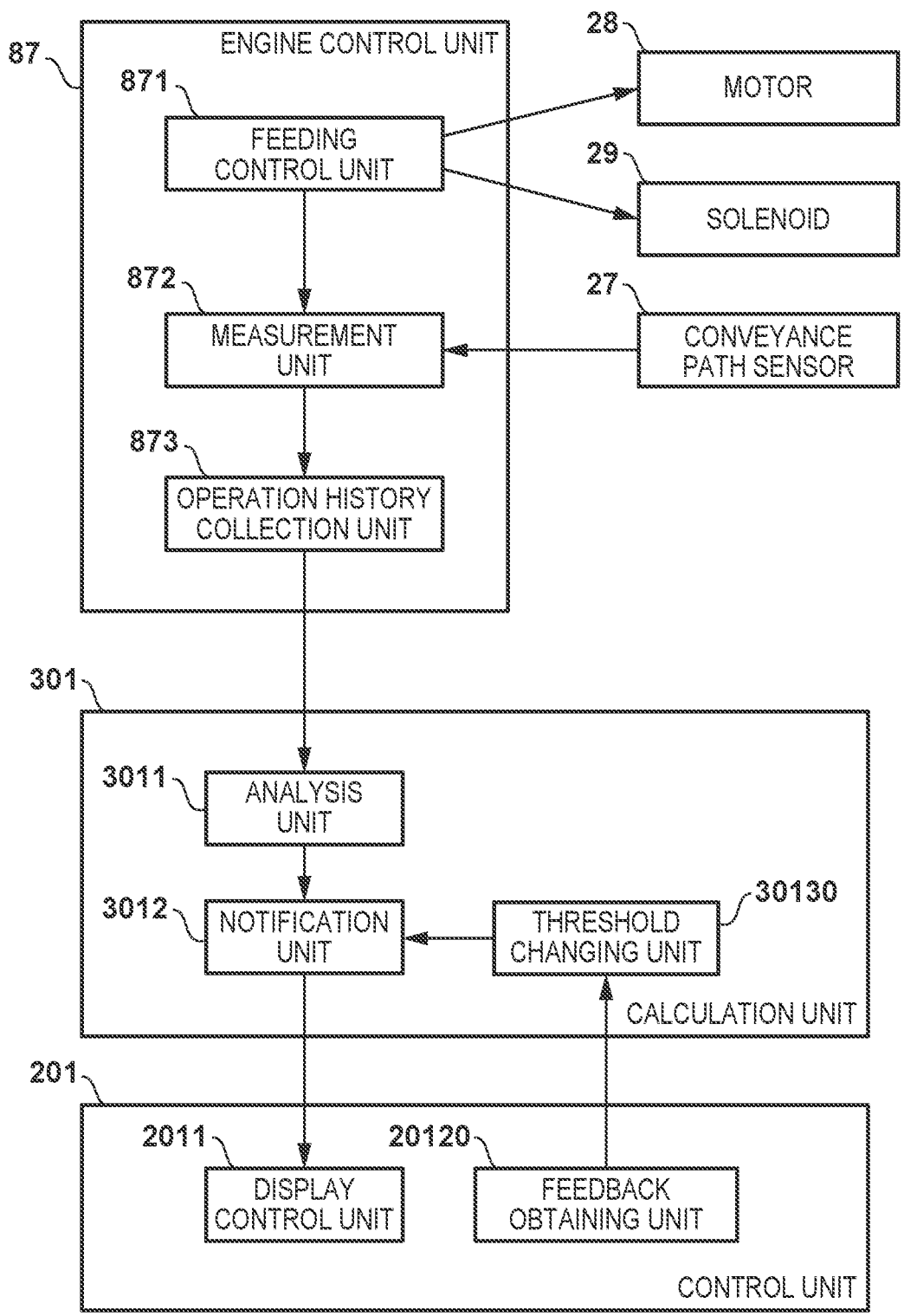
FIG. 14 is a functional block diagram of the image forming system according to an embodiment.

The following describes a fifth embodiment mainly about differences from each of the above described embodiments. FIG. 14 is a functional block diagram in the present embodiment of the system shown in FIG. 4. Even in this embodiment, the operation history collection unit 873 transmits the measurement timing and the feeding time at the measurement timing, which are stored into the RAM 82, to the server SV as an operation history.

Upon receiving the operation history, the server SV stores the received history as operation history information into the storage apparatus 302. FIG. 15A illustrates one example of the operation history information according to the present embodiment. The analysis unit 3011 obtains the variance value V of the feeding time of an X number of sheets S each time the operation history of the X number of sheets S is received. In the present embodiment, as an example, X=1000. The analysis unit 3011 obtains an evaluation value E for evaluating the degree of deterioration due to wear of the feed roller 22 based on the variance value V.

Therefore, in the storage apparatus 302 of the server SV, evaluation value determination information indicating the relationship between the variance value V and the evaluation value E is stored in advance. In this example, it is assumed that the determination formula represented by the following Formula (1) is stored in the storage apparatus 302 as the evaluation value determination information.

$$E = 400 - 5V/4 \quad (1)$$

According to Formula (1), when the variance value V is 0, the evaluation value E is 400, and when the variance value V is 240, the evaluation value E is 100, and when the variance value V is 320, the evaluation value E is 0. Since the variance value V increases as the degree of deterioration due to wear of the feed roller 22 increases, the evaluation value E obtained by the Formula (1) indicates that the degree of deterioration due to wear of the feed roller 22 increases as the evaluation value E decreases. Note, configuration may be taken so that the evaluation value E is set such that the evaluation value E becomes larger as the degree of deterioration due to the wear of the feed roller 22 is higher. In addition, instead of obtaining the evaluation value E by the determination formula, for example, a table indicating a relationship between each of the variance values V and the evaluation value E can be used as the evaluation value determination information.

When the analysis unit 3011 determines the evaluation value E, the notification unit 3012 determines whether or not to notify the host computer HC of the maintenance message related to the maintenance of the feed roller 22, and determines the content of the maintenance message to be notified when the notification is made based on the notification determination information shown in FIG. 15B. The notification determination information is stored in the storage apparatus 302 of the server SV. According to the FIG. 15B, the notification determination information includes two thresholds, a first threshold and a second threshold. In the FIG. 15B, the value of the first threshold is 20, and the value of the second threshold is 0. The first threshold is a threshold for determining whether or not to make a notification of the maintenance message. The second threshold is a threshold for determining whether or not replacement of the feed roller 22 is required at the present time.

According to the notification determination information in FIG. 15B, when the evaluation value E is greater than 20, the notification unit 3012 does not notify the host computer HC of the maintenance message. Also, when the evaluation value E is greater than 0 and within the range of 20 or less, the notification unit 3012 notifies the host computer HC of a maintenance message saying "Please prepare to replace the feed roller". This maintenance message is a maintenance message that announces that replacement of the feed roller 22 is near. That is, since in this maintenance message it is predicted that replacement of the feed roller 22 will be required in the near future, it is a message that urges the user to prepare for replacement of the feed roller 22, that is, arrange for the feed roller 22 to be replaced. Furthermore, in the case where the evaluation value E is equal to or less than 0, the notification unit 3012 notifies a maintenance message saying "Please replace the feed roller" to the host computer HC. This maintenance message is a message that urges the user to replace the feed roller 22.

Note that, in the present embodiment, for the sake of simplifying the description, a description is given on the assumption that a maintenance message or the like is notified to a "user" who uses the image forming apparatus PR. However, it is also possible to configure the system to notify maintenance messages and the like to an "administrator" who performs maintenance or management for those using the image forming apparatus PR, rather than a "user". In other words, in the description of the processing performed for the "user" of this embodiment and the processing performed by the "user", the term "user" can be replaced with "administrator" who performs maintenance management of the image forming apparatus PR based on a contract with those using the image forming apparatus PR, such as a dealer of the image forming apparatus PR.

Returning to FIG. 14, upon receiving the maintenance message from the notification unit 3012, the display control unit 2011 of the host computer HC displays the maintenance message on the operation display unit 202 and urges the user to maintain the feed roller 22.

Also, a threshold changing unit 30130 of the server SV causes the operation display unit 202 of the host computer HC to display the screen illustrated in FIG. 16 via the notification unit 3012. The timing at which the threshold changing unit 30130 displays the screen illustrated in FIG. 16 may be, for example, a periodic timing such as each month, half a year, or once a year. Alternatively, the timing at which the threshold changing unit 30130 causes the screen shown in FIG. 16 to be displayed may be the timing at which the notification unit 3012 transmits a maintenance message urging preparation for replacement to the display control unit 2011, or the timing after a predetermined period from the time of transmission.

For example, according to the screen shown in FIG. 16, the user selects one of "late" (or "slow"), "good as it is", and "early" (or "fast") as the notification timing for replacement preparation, and presses the "answer" button, thereby inputting feedback on the notification timing to the host computer HC. For example, in the case of a user printing a small number of printed sheets per day, the actual timing of replacement could be a year from then even though the user was prepared by receiving a notification of preparation for replacing the feed roller 22. Conversely, in the case of a user printing a large number of printed sheets, there may be a case where it is not possible to arrange for replacement parts in time after receiving notification that of preparation for replacing the feed roller 22. A feedback obtaining unit 20120 notifies the server SV of the feedback obtained from the user.

Upon receiving the feedback from the host computer HC, the threshold changing unit 30130 changes the first threshold of the notification determination information based on the change information shown in the FIG. 17A. That is, the threshold changing unit 3013 changes the range of the evaluation value E for which it is determined that a notification of the maintenance message urging the replacement preparation will be made. For example, in a case where the feedback is "early", the threshold changing unit 3013 decreases the first threshold of the notification determination information by 3 from the present value to 17, as shown in FIG. 17B. Therefore, the range of the evaluation value E for which it is determined that make a notification of the maintenance message urging the replacement preparation will be made is changed from a range of greater than 0 and less than or equal to 20 to a range of greater than 0 and less than or equal to 17. Since the first threshold is changed so as to be smaller, the timing for urging the replacement preparation of the feed roller 22 is made to be later. On the other hand, when the feedback is "late", the threshold changing unit 3013 increases the first threshold of the notification determination information by 3 from the present value to 23. Since the first threshold is changed so as to be larger, the timing for urging the replacement preparation of the feed roller 22 is made to be earlier.

Figure 18:
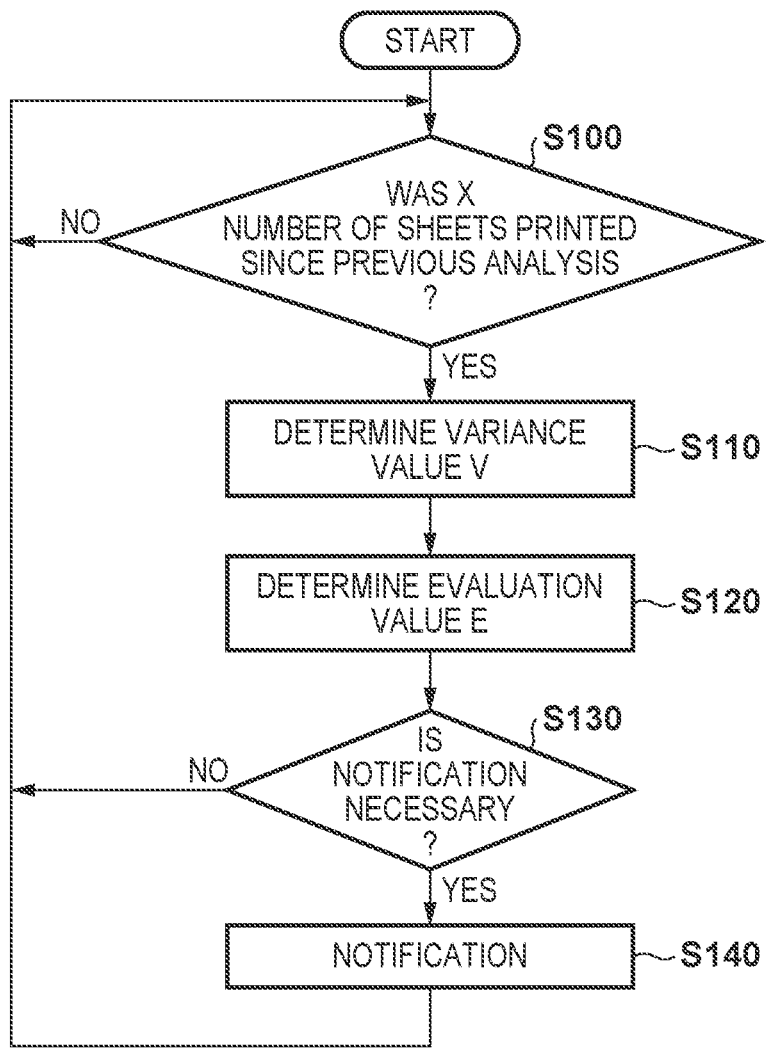
FIG. 18 is a flowchart of processing executed by a server according to an embodiment.

FIG. 18 is a flowchart of processing executed by the calculation unit 301 of the server SV. The analysis unit 3011 waits until the number of printed sheets since the previous analysis reaches X number of sheets in step S100. That is, after the previous analysis is executed, the analysis unit 3011 waits until an X number, which is a predetermined number, of feeding times, which are values indicating the condition of the feed roller 22, are obtained. When the number of printed sheets since the previous analysis reaches X, the analysis unit 3011 performs the analysis described below. First, the analysis unit 3011 obtains the variance value V of the feeding times of the previous X number of sheets in step S110. Subsequently, the analysis unit 3011 obtains, in step S120, the evaluation value E of the degree of deterioration of the feed roller 22 based on the variance value V. In step S130, the analysis unit 3011 refers to the notification determination information based on the evaluation value E of the degree of deterioration, and determines whether or not the maintenance message notification to the host computer HC is necessary and, in a case where the notification is necessary, the content of the maintenance message to be notified. In a case where the notification is not required, the analysis unit 3011 repeats the process from step S100. On the other hand, in a case where the notification is required, in step S140, the analysis unit 3011 notifies the host computer HC of the determined maintenance message, and then repeats the processing from step S100.

Note, in the present embodiment, the threshold changing unit 30130 of the server SV transmits the information of the screen shown in FIG. 16 to the host computer HC via the notification unit 3012 at the timing for obtaining the feedback from the user, and displays the information on the operation display unit 202. However, instead of controlling the timing at which the threshold changing unit 30130 obtains the feedback, configuration may be taken so that the display control unit 2011 determines the timing at which the feedback is obtained. In this case, the information of the screen illustrated in FIG. 16 may be set in advance in the host computer HC. Furthermore, the host computer HC displays the screen shown in FIG. 16 to urge the user to input feedback at every predetermined period of time or by receiving a maintenance message urging preparation for replacement from the notification unit 3012 of the server SV.

Note that in the present embodiment, configuration may be taken so that only the first threshold of the notification determination information is changed based on feedback from the user, but the second threshold can also be changed. For example, in FIG. 16, only the notification timing of the preparation for replacement is inquired about, but the notification timing for replacement can be inquired about separately, and the second threshold can be changed based on the feedback. Note that the timing at which the notification timing for replacement is inquired about may be a timing at every predetermined period or after the operation display unit 202 displays a maintenance message urging the replacement. In addition, configuration may be taken so that both the first threshold and the second threshold are changed based on the feedback on the notification timing of the preparation for replacement. In this case, if the feedback on the inquiry in FIG. 16 is "early", then the first threshold is changed to 17 and the second threshold is changed from 0 to −3 as shown in FIG. 17A. Note that the change amount of the threshold may be different between the first threshold and the second threshold.

Further, in the present embodiment, two types of maintenance messages including a maintenance message urging preparation for replacement and a maintenance message urging replacement are used, but the number of maintenance messages to be used may be any number of one or more. Further, in the present embodiment, although the maintenance message is transmitted to the host computer HC, configuration may be taken so that the maintenance message is transmitted to the image forming apparatus PR and displayed on the operation display unit 86 of the image forming apparatus PR. Further, for the feedback, configuration may be taken so that an inquiry screen as shown in FIG. 16 is displayed on the operation display unit 86 of the image forming apparatus PR, and the server SV obtains the inquiry screen from the image forming apparatus PR.

As described above, the range of the evaluation values determined for making a notification of the maintenance message based on the feedback from the user is changed. Specifically, in a case where the notification timing of the maintenance message is "early", the range is changed so that the notification timing of the maintenance message becomes later. Also, in a case where the notification timing of the maintenance message is "late", the range is changed so that the notification timing of the maintenance message becomes earlier. Note, in a case where the notification timing of the maintenance message is "good as it is", the range is not changed. With this configuration, the maintenance message can be notified at an appropriate timing in accordance with the use state of the image forming apparatus or the like.

Sixth Embodiment

Figure 19:
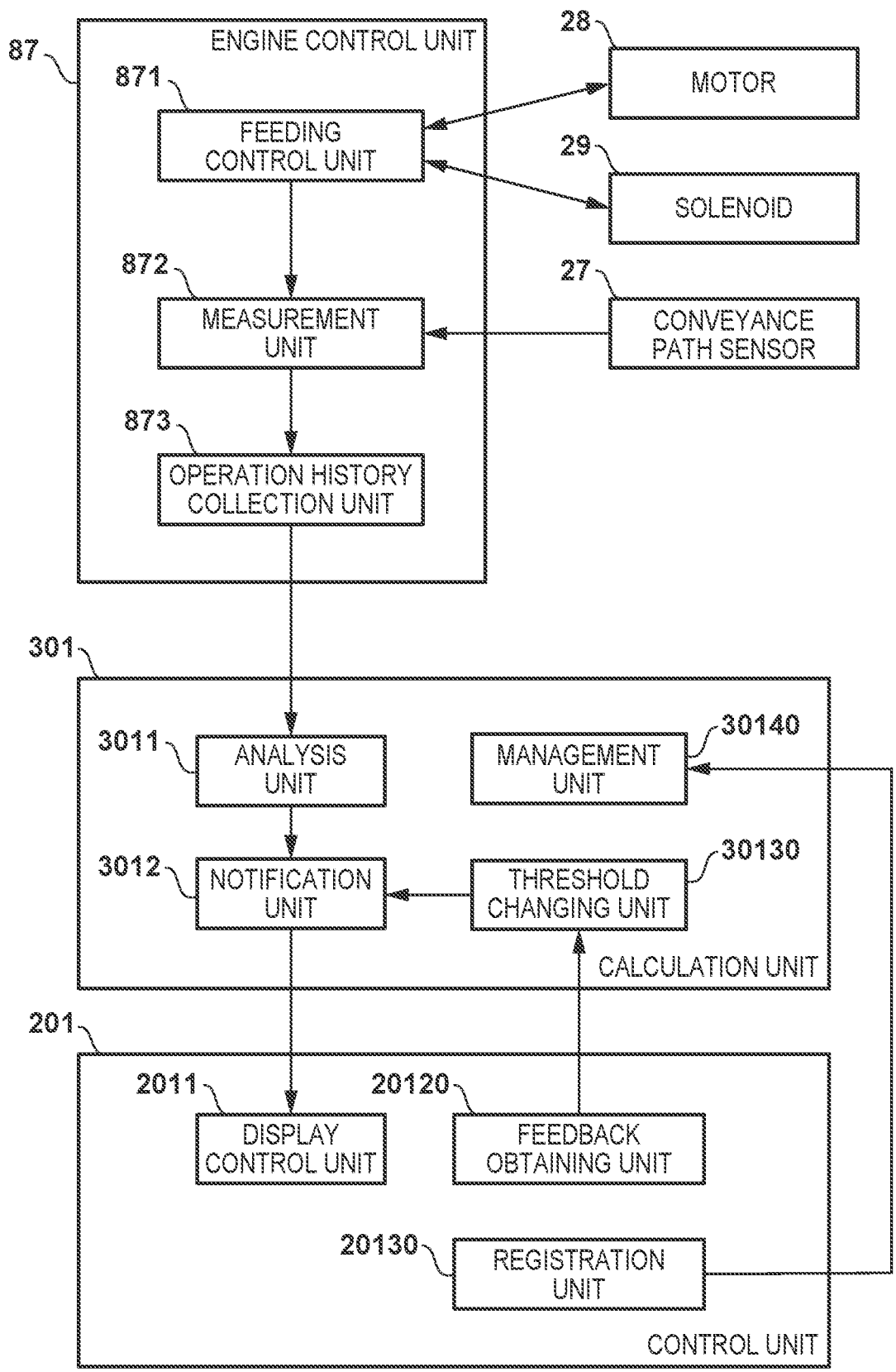
FIG. 19 is a functional block diagram of the image forming system according to an embodiment.

The following describes a sixth embodiment mainly about differences from each of the above described embodiments. FIG. 19 is a functional block diagram in the present embodiment of the system shown in FIG. 4. In the present embodiment, the term "administrator" is used instead of "user" of the image forming apparatus PR. However, the "administrator" of the present embodiment can also be read as "user".

The administrator inputs, for example, the identification information (administrator ID) of the administrator and the identification information (device ID) of the image forming apparatus PR to be managed via the operation display unit 202 of the host computer HC. A registration unit 20130 of the host computer HC notifies the management unit 30140 of the server SV of the pairing of the administrator ID and the device ID. The storage apparatus 302 of the server SV stores the administrator information shown in FIG. 20A. The administrator information is information indicating a relationship between the administrator ID and the device ID of the image forming apparatus PR managed by the administrator of that administrator ID, that is, information indicating the image forming apparatus PR managed by each administrator. Upon receiving the pair of the administrator ID and the device ID from the registration unit 20130, the management unit 30140 adds the received pair to the administrator information. Note that a configuration may be taken in which a pair of the administrator ID and the device ID is input from the server SV or the image forming apparatus PR.

In the present embodiment, when notifying the server SV of the history, the operation history collection unit 873 also notifies the device ID. Therefore, each history of the operation history information stored in the storage apparatus 302 of the server SV is associated with the device ID. As in the fifth embodiment, the analysis unit 3011 executes the analysis every time X pieces of the operation history of a certain device ID are added, and stores the history of the analysis result, that is, the history of the evaluation value E, in the storage apparatus 302 as the evaluation history information. FIG. 20B shows an example of the evaluation history information of the device ID of FIG. 20A being #567. In FIG. 20B, in Jan. 9, 2020, the evaluation value E has increased significantly more than before because the feed roller 22 has been replaced. For example, when the feed roller 22 is replaced, it is inputted that the replaced feed roller 22 has been replaced to the operation display unit 86 of the image forming apparatus PR or the operation display unit 202 of the host computer HC. The image forming apparatus PR or the host computer HC notifies the server SV that the feed roller 22 has been replaced based on the input, and thereby the server SV can obtain the replacement timing of the feed roller 22. Further, the analysis unit 3011 can determine that the feed roller 22 has been replaced based on the evaluation history information. For example, the analysis unit 3011 may compare a certain evaluation value E with a subsequent evaluation value E, and determine that the feed roller 22 has been replaced in a case where the subsequent evaluation value E is larger and the amount of change is larger than a predetermined value.

In the fifth embodiment, in order to obtain feedback from the administrator, only the inquiry screen shown in FIG. 16 is displayed on the operation display unit 202 of the host computer HC. In the present embodiment, the threshold changing unit 30130 selects a screen to be displayed on the operation display unit 202 of the host computer HC in order to obtain feedback from three screens. FIG. 16 is one of the three screens, and FIG. 21A and FIG. 21B show the remaining two of the three screens. FIG. 16 shows three options as the notification timings of the maintenance message: "late", "good as it is", and "early", that is, three options. On the other hand, FIG. 21A has two options: whether the notification timing of the maintenance message is to be made earlier or left unchanged, and the FIG. 21B has two options: whether the notification timing of the maintenance message is to be made later or left unchanged. In other words, the screens of FIGS. 21A and 21B present two options.

The threshold changing unit 30130 uses the evaluation history information shown in the FIG. 20B to select a screen to be used from the three screens. First, the threshold changing unit 30130 divides a range of consecutive evaluation values E into three sections. FIG. 22 shows one example. In FIG. 22, the range is divided into section C #1 which is larger than 13 and 20 or less, section C #2 which is larger than 7 and 13 or less, and section C #3 which is 7 or less. Incidentally, the section C #1 including the evaluation value E indicating that the degree of deterioration is the lowest among the three sections includes the evaluation value E (20 in FIG. 15B) indicating that the degree of deterioration is the lowest within the range for notifying the message urging the replacement preparation. Also, the section C #3 including the evaluation value E indicating that the degree of deterioration is the highest among the three sections includes the evaluation value E (0 in FIG. 15B) indicating that the degree of deterioration is the highest within the range for notifying the message urging the replacement preparation. The threshold changing unit 30130 determines an evaluation value immediately before the feed roller 22 is replaced based on the evaluation history information. Hereinafter, the evaluation value immediately before (the time of replacement) the feed roller 22 is replaced is referred to as a "first evaluation value". The threshold changing unit 3013 obtains the number N #1 of the first evaluation value in the section C #1, the number N #2 of the first evaluation value in the section C #2, and the number N #3 of the first evaluation value in the section C #3. Note, the numbers N #1, N #2, and N #3 are counted for the history information of evaluations of all the image forming apparatuses PR managed by a certain manager.

FIG. 22 shows the numbers N #1, N #2, and N #3 for the administrator with administrator ID #ABC shown in FIG. 20A. According to FIG. 22, the numbers of sections C #1, C #2, and C #3 for the image forming apparatus PR of the apparatus ID #567 are 2, 0, and 0, respectively. Also, the numbers of sections C #1, C #2, and C #3 for the image forming apparatus PR of the apparatus ID #568 are 1, 1, and 0, respectively. Further, the numbers of sections C #1, C #2, and C #3 for the image forming apparatus PR of the apparatus ID #569 are 1, 0, and 0, respectively. Therefore, the numbers N #1, N #2, and N #3 for the administrator of the administrator ID #ABC are 4, 1, and 0, which are the sum of the numbers of the three image forming apparatuses PR, respectively. Subsequently, the threshold changing unit 3013 obtains the ratios R #1, R #2, and R #3 of the numbers N #1, N #2, and N #3 with respect to the total number of the first evaluation values. Since the total number is 5, the ratios R #1, R #2, and R #3 are 80%, 20%, and 0%, as shown in FIG. 22. Note, the numbers N #1, N #2, and N #3 correspond to a degree of a histogram whose evaluation values are classes. The ratios R #1, R #2, and R #3 correspond to a normalization of the degree.

Figure 23:
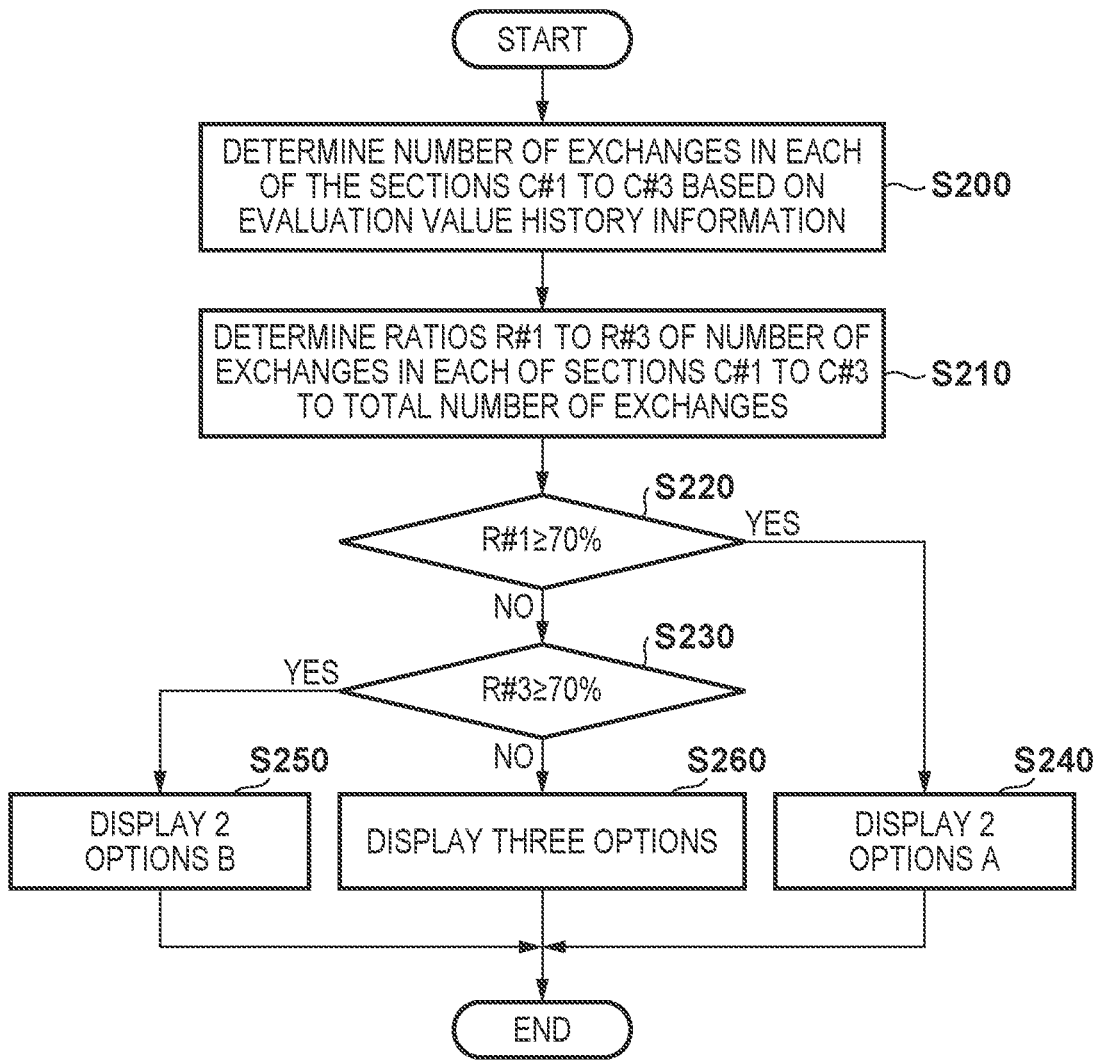
FIG. 23 is a flowchart of processing executed by the server according to an embodiment.

FIG. 23 is a flowchart of processing performed by the threshold changing unit 30130 to select a screen to be used from three screens. In step S200, the threshold changing unit 30130 determines the numbers N #1 to N #3 of the sections C #1 to C #3, respectively, based on the evaluation history information, and determines the ratios R #1 to R #3 of the numbers N #1 to N #3 in step S210. The threshold changing unit 30130 determines whether or not the ratio R #1 is equal to or greater than the threshold value of 70% in step S220. In a case where R #1 is equal to or greater than the threshold of 70%, the threshold changing unit 30130 determines that the screen (2 options A) shown in FIG. 21A is to be used in step S240. On the other hand, if the ratio R #1 is not equal to or greater than 70% in step S220, the threshold changing unit 30130 determines, in step S230, whether the ratio R #3 is equal to or greater than the threshold value of 70%. In a case where R #3 is equal to or greater than the threshold of 70%, the threshold changing unit 30130 determines that the screen (2 options B) shown in FIG. 21B is to be used in step S250. On the other hand, if the ratio R #3 is not equal to or greater than 70% in step S230, the threshold changing unit 30130 determines, in step S260, to use the screen (3 options) illustrated in FIG. 16.

For example, as illustrated in FIG. 22, it can be determined that an administrator who often replaces the feed roller 22 when the evaluation value E is in the section C #1 is an administrator who will perform the replacement earlier. In this case, even if such an administrator is presented with "later" (or the notification timing is "early") as an option, it is unlikely that they will select that option. Therefore, in such cases, it is preferable to display the screen shown in FIG. 21A and inquire to the administrator whether the notification timing is to be made earlier or left as it is. On the other hand, it can be determined that an administrator who often replaces the feed roller 22 when the evaluation value E is in the section C #3 is an administrator who is late at performing replacement. Therefore, in such cases, it is preferable to display the screen shown in FIG. 21B and inquire to the administrator whether the notification timing is to be made later than it currently is or left as it is. Further, in the case of an administrator who often replaces the feed roller 22 when the evaluation value E is in the section C #2 or an administrator with an average number of times of each section, it is preferable to inquire whether to make the notification timing earlier or later than the current value or to keep the current value with the basic screen of FIG. 16.

In summary, in the present embodiment, three options ("earlier," "later," and "good as it is") are used as feedback options to be selected by the administrator. Also, each are provided as three sets associated with two or more of the three options (presentation options). Here, the first set corresponds to the screen in FIG. 21A, and is associated with two options, whether the notification timing for preparing for replacement is made earlier or left as it is. Here, the second set corresponds to the screen in FIG. 16, and is associated with three options, whether the notification timing for preparing for replacement is made earlier, made later, or left as it is. Here, the third set corresponds to the screen in FIG. 21B, and is associated with two options, whether the notification timing for preparing for replacement is made later or left as it is. Note that the second set including all three options to be used is the reference set.

Since the number of sets is three, in the present embodiment, three sections C #1 to C #3 are set, and the first to third sets are respectively associated with the sections. For example, in the present embodiment, the first set corresponds to section C #1, the second set corresponds to section C #2, and the third set corresponds to section C #3. Note, among the sections C #1 to C #3, the section C #1 including the evaluation value E having the largest evaluation value E is a section including the largest evaluation value within a range in which it is determined that a notification of the maintenance message urging preparation for replacement will be made. Also, among the sections C #1 to C #3, the section C #3 including the evaluation value E having the smallest evaluation value E is a section including the smallest evaluation value within a range in which it is determined that a notification of the maintenance message urging preparation for replacement will be made.

The threshold changing unit 30130 determines to present to the administrator an option associated with a set corresponding to a section in which the ratio (R #1 to R #3) of the number of the first evaluation value in each section is equal to or larger than a predetermined value. Note that in the example of FIG. 23, the predetermined value is 70%, and the ratio of two or more sections is selected so as not to be equal to or greater than the predetermined value at the same time. In addition, when there is no section in which the ratio is equal to or larger than the predetermined value, the threshold changing unit 30130 determines to present the reference set, that is, the options associated with the second set in this example to the administrator.

Although the above is a case where three sets are provided, the options to be used may be any number of three or more. For example, configuration may be taken so that a total of five options are used by using "slightly earlier" and "much earlier" instead of the option "earlier" and by using "slightly later" and "much later" instead of the option "later". Note that the amount of increase of the first threshold is different for "slightly earlier" and "much earlier". The same applies to the case of later. Also, configuration may be taken to set four or more sets by associating two or more options among the five options with each set. In this case, four or more sections may be set.

As described above, in the present embodiment, options to be presented to the administrator are determined based on the replacement timing of the replacement unit by the administrator. Therefore, it is possible to suppress the presentation of options that are considered unnecessary for the administrator. Further, the notification timing of the maintenance message can be made appropriate for the administrator based on the feedback by the administrator. Note, in the present embodiment, the inquiry screen is selected in step S240, step S250, and step S260 of the flow chart of FIG. 23. However, instead of selecting the inquiry screen, configuration may be taken so that the first threshold of the notification determination information changes in step S240, step S250, and step S260. For example, configuration may be taken so that, in step S240, the first threshold is increased by a predetermined value, in step S250, the first threshold is decreased by a predetermined value, and in step S260, the first threshold is not changed. That is, configuration may be taken so that the tendency of the administrator is determined based on the evaluation history information, and the threshold of the notification determination information is adjusted without inquiring to the administrator whether the timing of the maintenance message is appropriate.

Seventh Embodiment

Figure 24:
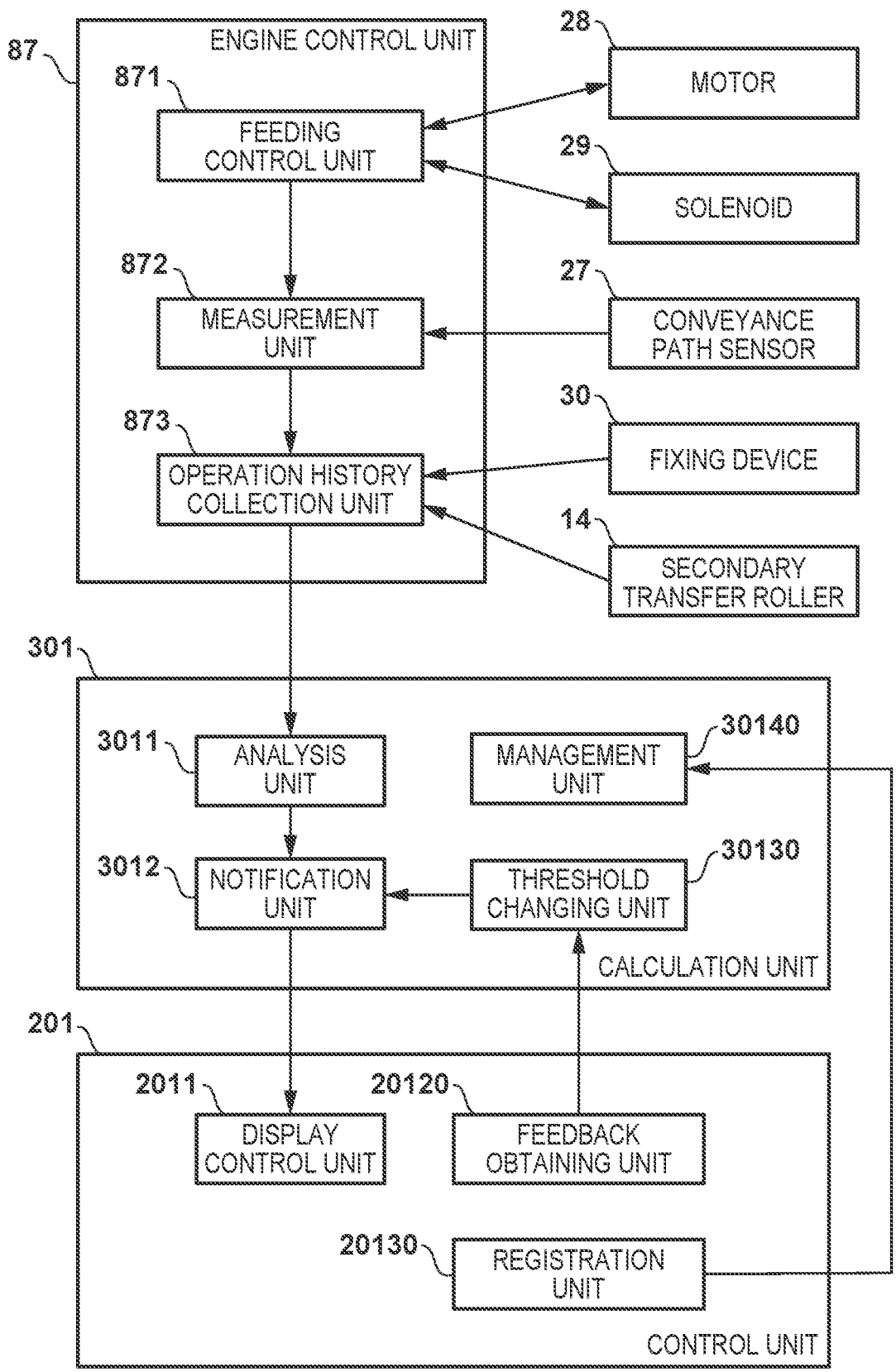
FIG. 24 is a functional block diagram of the image forming system according to an embodiment.

The following describes a seventh embodiment mainly about differences from the sixth embodiment. FIG. 24 is a functional block diagram in the present embodiment of the system shown in FIG. 4, and is mainly described below with respect to differences from the functional blocks of the sixth embodiment.

In the present embodiment, the operation history collection unit 873 collects values related to the operation state for each of the fixing device 30 and the secondary transfer roller 14. For example, the fixing device 30 may be configured to collect the rotation time of the rollers in the fixing device 30. The secondary transfer roller 14 may be configured to collect the resistance value. Note, the resistance value can be determined based on the potential of the secondary transfer roller 14 for transferring the toner image of the intermediate transfer belt 11 to the sheet S and the transfer current flowing through the secondary transfer roller 14. The operation history collection unit 873 also transmits the values collected for each of the fixing device 30 and the secondary transfer roller 14 as an operation history to the server SV.

Each time X number of sheets are printed, the analysis unit 3011 obtains an evaluation value E for each of the feed roller 22, the fixing device 30, and the secondary transfer roller 14. Note that the evaluation values E of the feed roller 22, the fixing device 30, and the secondary transfer roller 14 are set to have the same values when the degree of deterioration is the same. The analysis unit 3011 individually determines whether or not to make a notification of a maintenance message based on the evaluation value E for each of the feed roller 22, the fixing device 30, and the secondary transfer roller 14. Note that the first threshold and the second threshold of the notification determination information can be set independently for the feed roller 22, the fixing device 30, and the secondary transfer roller 14, respectively. In addition, in the present example, in a case where the degree of deterioration is the same, since each evaluation value is set to have the same value, it is possible that the first threshold and the second threshold are shared by the feed roller 22, the fixing device 30, and the secondary transfer roller 14.

When the analysis is performed, the analysis unit 3011 records the evaluation history information as shown in FIG. 20B, similarly to the sixth embodiment. The threshold changing unit 30130 selects an inquiry screen to the administrator based on the evaluation history information, in the same manner as described in FIG. 20B of the sixth embodiment. The inquiry screen is similar to the screens of FIG. 16, FIG. 21A, and FIG. 21B, but the "feed roller" part is changed to a generic term that does not indicate a specific replacement part, such as a "replacement unit", for example. FIG. 25 is an explanatory diagram of a process for the threshold changing unit 30130 to select a screen to be used from three screens. In FIG. 25, for the feed roller 22, the numbers of sections C #1, C #2, and C #3 is 0, 1, and 2. Also, for the fixing device 30, the numbers of sections C #1, C #2, and C #3 are 1, 0, and 1. Also, for the secondary transfer roller 14, the numbers of sections C #1, C #2, and C #3 are 0, 0, and 2. Therefore, the numbers N #1, N #2, and N #3 for the administrator of the administrator ID #ABC are 1, 1, and 5, which are the sum for all replacement units. Subsequently, the threshold changing unit 30130 obtains the ratios R #1, R #2, and R #3 of the numbers N #1, N #2, and N #3 with respect to the total number. Since the total number is 7, as illustrated in FIG. 25, the ratios R #1, R #2, and R #3 are approximately 14.5%, 14.5%, and 71%.

In the present embodiment, a flowchart of a process for selecting a screen to be used from the three screens is similar to FIG. 23 of the sixth embodiment. In the example of FIG. 25, since the processing advances to step S250, the threshold changing unit 3013 causes the host computer HC to display "2 option B", that is a screen for inquiring to the administrator whether the notification timing is to be made later or left as it is.

In the present embodiment, an option to be presented to the administrator is determined based on the tendency of the replacement timing for a plurality of replacement units, rather than the tendency of the replacement timing for one replacement unit. Therefore, it is possible to accurately determine the tendency regarding the replacement of replacement units, and to present an appropriate option to the administrator. Note, configuration may be taken so that the sixth embodiment and the seventh embodiment are combined to determine the options to be presented to the administrator based on the replacement times of the plurality of replacement units of each of the plurality of apparatuses.

Note that the server SV according to each embodiment may be realized by a plurality of apparatuses configured to be able to communicate with each other via a network. The server SV may be installed at a location different from the image forming apparatus PR. Furthermore, the functions of the server SV can be realized on the functions provided by a cloud computing service.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-185149, filed Nov. 12, 2021, and Japanese Patent Application No. 2022-011139, filed Jan. 27, 2022 which are hereby incorporated by reference herein in their entirety.

What is claimed is:

1. An information processing apparatus comprising:
   one or more processors; and
   one or more memories storing one or more computer programs,
   wherein
   the one or more computer programs, when executed by the one or more processors, cause the information processing apparatus to function as:
   a reception unit configured to receive history information, from a device, indicating an operation history of a predetermined operation in the device;
   an analysis unit configured to execute an analysis of a condition of the device based on the history information in a case where an execution condition of the analysis is satisfied; and
   a setting unit configured to set the execution condition of the analysis, and
   wherein the setting unit sets the execution condition of the analysis based on an analysis result of the analysis executed by the analysis unit, and
   wherein the setting unit sets a first execution condition of the analysis in a case where a degree of condition of the device is a first stage and sets a second execution condition of the analysis in a case where the degree of condition of the device is a second stage better than the first stage, and
   an execution frequency of the analysis by the analysis unit based on the second execution condition is less than an execution frequency of the analysis by the analysis unit based on the first execution condition.

2. The information processing apparatus according to claim 1,
   wherein the condition of the device is classified into at least two stages of the degree of condition of the device, and
   the setting unit sets the execution condition of the analysis based on the degree of condition of the device.

3. The information processing apparatus according to claim 1,
   wherein the one or more computer programs, when executed by the one or more processors, further cause the information processing apparatus to function as
   a notification unit configured to notify an action that a user should execute on the device based on the analysis result of the analysis executed by the analysis unit.

4. The information processing apparatus according to claim 1,
   wherein the analysis unit executes the analysis of the condition of the device based on a variance value of values indicated by the operation history of the predetermined operation of a previous predetermined number of times.

5. The information processing apparatus according to claim 4, wherein the device includes a sheet conveyance device for conveying sheets along a conveyance path, and the values indicated by the operation history of the predetermined operation are times taken to convey the sheets through a predetermined section of the conveying path.

6. The information processing apparatus according to claim 5, wherein the device is an image forming apparatus that includes the sheet conveyance device.

7. The information processing apparatus according to claim 1, wherein the execution condition of the analysis is a condition based on a period of time.

8. The information processing apparatus according to claim 1, wherein the execution condition of the analysis is a condition based on a number of times of the predetermined operation.

* * * * *